United States Patent
Tsujimoto et al.

(10) Patent No.: US 10,317,202 B2
(45) Date of Patent: Jun. 11, 2019

(54) PARAMETER SETTING METHOD OF MEASURING INSTRUMENT AND COMPUTER READABLE MEDIUM

(71) Applicant: MITUTOYO CORPORATION, Kawasaki-shi, Kanagawa (JP)

(72) Inventors: Yasuhiro Tsujimoto, Kawasaki (JP); Takefumi Kiwada, Nakatsugawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 916 days.

(21) Appl. No.: 14/837,518

(22) Filed: Aug. 27, 2015

(65) Prior Publication Data

US 2016/0061579 A1  Mar. 3, 2016

(30) Foreign Application Priority Data

Sep. 1, 2014  (JP) .................................. 2014-176859

(51) Int. Cl.
*G01B 5/14* (2006.01)
*G01B 3/38* (2006.01)
(Continued)

(52) U.S. Cl.
CPC .................................. *G01B 21/047* (2013.01)

(58) Field of Classification Search
CPC ...... G01B 21/20; G01B 21/047; G01B 21/00; G01B 21/04
See application file for complete search history.

(56) References Cited

U.S. PATENT DOCUMENTS 7,051,281 B1   5/2006  Yokota
2001/0005269 A1  6/2001  Nozawa
(Continued)

FOREIGN PATENT DOCUMENTS

JP   2000-075989 A   3/2000
JP   2000-293333 A   10/2000
(Continued)

OTHER PUBLICATIONS

Apr. 3, 2018 Office Action issued in Japanese Patent Application No. 2014-176859.

*Primary Examiner* — Regis J Betsch
*Assistant Examiner* — Jeremy A Delozier
(74) *Attorney, Agent, or Firm* — Oliff PLC

(57) ABSTRACT

A parameter setting method of a measuring instrument includes: reading model information, measurement-related setting items, and parameters corresponding to the setting items, which are stored in the measuring instrument, and temporarily storing the read data in a storage unit of a computer; displaying an appearance image of the measuring instrument corresponding to the model information on the screen and displaying icons for selecting an operation on the screen at predetermined positions of the appearance image on the screen in correlation with each other; displaying the setting item, which is able to be selected by an operation in the measuring instrument relevant to the predetermined position corresponding to the selected icon, on the screen when selection of the icon is received; receiving changing of the parameter corresponding to the setting item using the computer; and transmitting the changed parameter from the computer to the measuring instrument.

28 Claims, 12 Drawing Sheets

(51) Int. Cl.
    *G01B 3/18*     (2006.01)
    *G01B 21/04*     (2006.01)

(56) References Cited

U.S. PATENT DOCUMENTS

| | | | |
|---|---|---|---|
| 2004/0032413 A1 | 2/2004 | Fuller | |
| 2009/0315867 A1* | 12/2009 | Sakamoto | G06F 3/03547 345/184 |
| 2014/0033554 A1* | 2/2014 | Nahum | G06F 9/44505 33/784 |
| 2014/0176426 A1* | 6/2014 | Morohoshi | G04R 20/26 345/156 |
| 2015/0026632 A1* | 1/2015 | Wakabayashi | H04N 5/23209 715/776 |

FOREIGN PATENT DOCUMENTS

| | | |
|---|---|---|
| JP | 2001-067203 A | 3/2001 |
| JP | 2005-233801 A | 9/2005 |
| JP | 2009-075763 A | 4/2009 |
| JP | 2009-288116 A | 12/2009 |
| JP | 2013-005247 A | 1/2013 |
| JP | 2014-032195 A | 2/2014 |

* cited by examiner

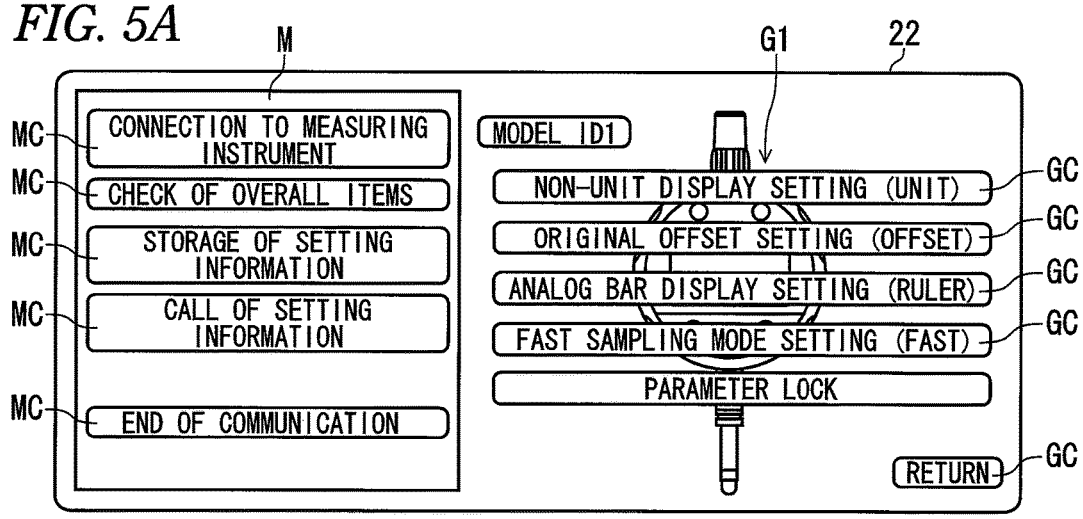
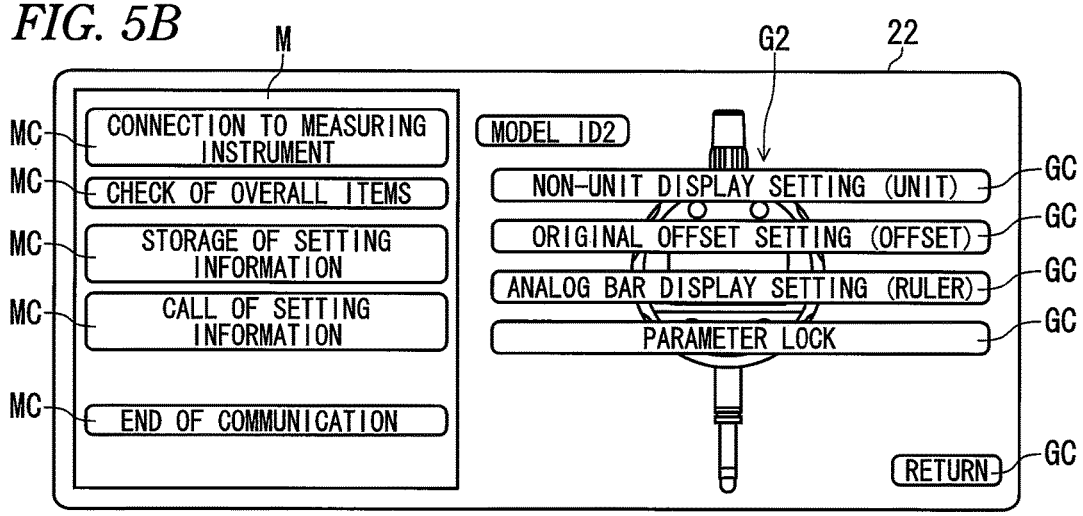
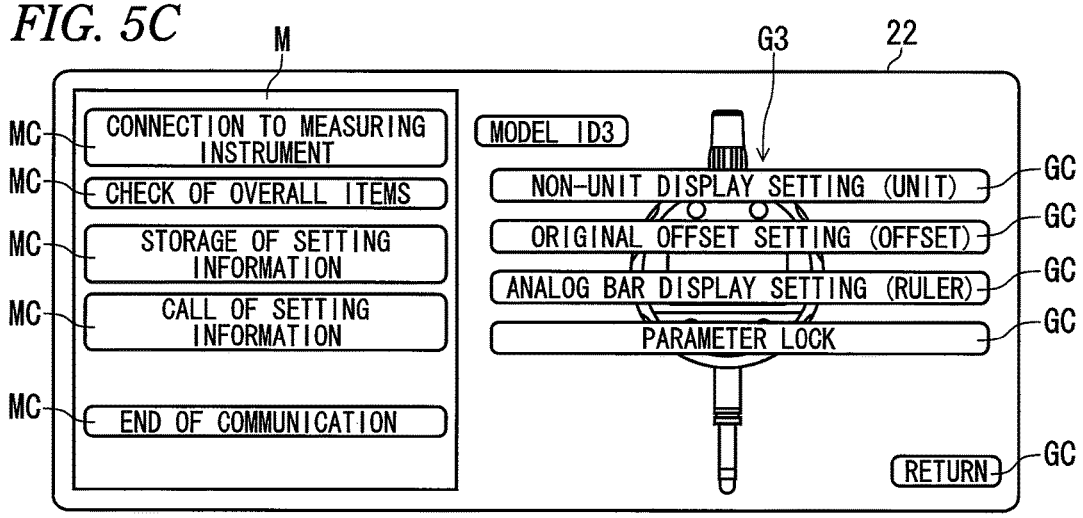

PARAMETER SETTING METHOD OF MEASURING INSTRUMENT AND COMPUTER READABLE MEDIUM

CROSS-REFERENCE TO RELATED APPLICATION(S)

This application is based upon and claims the benefit of priority from Japanese Patent Application No. 2014-176859, filed on Sep. 1, 2014, the entire contents of which are incorporated herein by reference.

BACKGROUND

1. Field of the Invention

The present invention relates to a parameter setting method of a measuring instrument of setting various parameters stored in the measuring instrument and a parameter setting program of a measuring instrument.

2. Description of the Related Art

In measuring instruments that measure a height and the like of an object based on displacement of a gauge head, a digital type in which measured values are displayed on a liquid crystal panel or the like has been widely used in recent years. In such digital measuring instruments, measurement can be accurately and easily carried out in a measurement mode selected by a user by setting various parameters of measurement conditions, display settings, and the like based on various measurement modes.

JP-A-2005-233801 discloses a system capable of inputting measurement data from a displacement detecting-measuring instrument to a computer, displaying the measurement data and a model image of the displacement detecting-measuring instrument on a monitor of the computer, and checking a state of the displacement detecting-measuring instrument on the monitor at any time.

JP-A-2014-032195 discloses a configuration in which a portable measurement gauge and a remote device are connected to each other and information of the portable measurement gauge is displayed on a display of the remote device.

However, for example, in a handheld small measuring instrument, a display unit such as a liquid crystal panel is small and the arrangement or the number of buttons is limited.

Accordingly, there is a problem in that operability is poor in setting various parameters in the measuring instrument. Particularly, in a measuring instrument having a lot of functions, it is necessary to set a lot of parameters in advance. It may be wanted to change parameters which have been set in advance. In this case, buttons should be operated a lot of times. In this way, setting or changing of parameters can be performed by operating the buttons, but there is a problem in that it is difficult to operate the buttons while watching a small display unit.

SUMMARY

An object of the invention is to provide a parameter setting method of a measuring instrument and a parameter setting program of a measuring instrument capable of easily setting parameters of the measuring instrument.

According to a first aspect of the invention, there is provided a parameter setting method of a measuring instrument connected with a computer, receiving an operation on a screen of the computer, and setting measurement-related parameters of the measuring instrument, the parameter setting method including: reading model information, measurement-related setting items, and parameters corresponding to the setting items, which are stored in the measuring instrument, and temporarily storing the read data in a storage unit of the computer; displaying an appearance image of the measuring instrument corresponding to the model information on the screen and displaying icons for selecting an operation on the screen at predetermined positions of the appearance image on the screen in correlation with each other; displaying the setting item, which is able to be selected by an operation in the measuring instrument relevant to the predetermined position corresponding to the selected icon, on the screen when selection of the icon is received; receiving changing of the parameter corresponding to the setting item using the computer; and transmitting the changed parameter from the computer to the measuring instrument.

According to this configuration, model information, setting items, and parameters, which are stored in the measuring instrument, can be read by the computer and the parameters can be changed by operation on a screen of the computer. In the invention, an appearance image of a measuring instrument is displayed on the screen of the computer and icons are displayed to correspond to predetermined positions of the appearance image. By selecting an icon displayed on the screen of the computer, a user can select a setting item in the same operation flow as when an actual measuring instrument is operated and can change the parameters while watching the screen.

According to a second aspect of the invention, in the parameter setting method according to the first aspect, the receiving of the changing of the parameter may include temporarily storing the changed parameter in the storage unit, and the transmitting of the changed parameter to the measuring instrument may include reading the changed parameter stored in the storage unit and transmitting the read parameter to the measuring instrument. According to this configuration, a changed parameter can be temporarily stored in the storage unit and then can be transmitted to the measuring instrument after waiting for a predetermined instruction.

According to a third aspect of the invention, in the parameter setting method according to the second aspect, the transmitting of the changed parameter to the measuring instrument may include reading the parameters corresponding to all the setting items stored in the storage unit and collectively transmitting the read parameters to the measuring instrument. According to this configuration, changed parameters can be collectively transmitted to the measuring instrument after waiting for a predetermined instruction.

According to a fourth aspect of the invention, in the parameter setting method according to any one of the first aspect to the third aspect, the receiving of the changing of the parameter may include temporarily storing the changed parameter in the storage unit and returning the changed parameter stored in the storage unit to the original parameter when a cancel instruction is received. According to this configuration, when a cancel instruction is given for a changed parameter which is temporarily stored in the storage unit, the changed parameter can be returned to the original parameter.

According to a fifth aspect of the invention, in the parameter setting method according to any one of the first aspect to the fourth aspect, the displaying of the setting items on the screen may include displaying an item for selecting a type of an attachment attached to the measuring instrument, and the receiving of the changing of the parameter may include receiving a dimension corresponding to the type of the attachment and calculating a calculation coefficient used for measuring using the attachment from the dimension.

According to this configuration, calculation coefficients used for measurement using an attachment attached to the measuring instrument can be automatically calculated depending on the type of the attachment. Accordingly, it is possible to easily set the calculation coefficients even when the attachment is replaced.

According to a sixth aspect of the invention, the parameter setting method according to any one of the first aspect to the fifth aspect may further includes displaying the icons corresponding to the setting items, in which the parameter is able to be changed by only the computer, on the screen. According to this configuration, only the computer can change a parameter which cannot be changed by the measuring instrument.

According to a seventh aspect of the invention, the parameter setting method according to any one of the first aspect to the sixth aspect may further includes: displaying an inhibition selection item, in which only the computer is able to select whether to inhibit the changing of the parameter corresponding to the setting item, on the screen; and transmitting information, which indicates that the changing of the parameter of the setting item corresponding to the inhibition selection item is inhibited in the measuring instrument, from the computer to the measuring instrument when a setting of inhibiting the changing of the parameter of the inhibition selection item is received.

According to this configuration, when the computer performs a setting of inhibiting changing of a parameter of a setting item corresponding to the inhibition selection item, the measuring instrument cannot change the parameter, that is, the changing of the parameter can be locked.

According to an eighth aspect of the invention, the parameter setting method according to any one of the first aspect to the seventh aspect may further includes displaying a list display icon, which is used to display a list of the setting items temporarily stored in the storage unit and the parameters corresponding to the setting items on the screen, on the screen. According to this configuration, a list of the setting items and the parameters in the measuring instrument can be displayed on the screen of the computer.

According to a ninth aspect of the invention, the parameter setting method according to any one of the first aspect to the eighth aspect may further includes the receiving of the changing of the parameter includes displaying the setting item of the changed parameter on the screen in a format different from that of the setting items of which the parameters are not changed. According to this configuration, a setting item of which the parameter is changed can be easily checked from the screen display.

According to a tenth aspect of the invention, there is provided a computer-readable medium storing a parameter setting program for causing a computer to perform predetermined operations, the predetermined operation including: reading model information, measurement-related setting items, and parameters corresponding to the setting items, which are stored in a measuring instrument connected with the computer, and temporarily storing the read data in a storage unit of the computer; displaying an appearance image of the measuring instrument corresponding to the model information on the screen and displaying icons for selecting an operation on the screen at predetermined positions of the appearance image on the screen in correlation with each other; displaying the setting item, which is able to be selected by an operation in the measuring instrument relevant to the predetermined position corresponding to the selected icon, on the screen when selection of the icon is received; receiving changing of the parameter corresponding to the setting item; and transmitting the changed parameter to the measuring instrument.

According to this configuration, model information, setting items, and parameters, which are stored in the measuring instrument, can be read by a program which is executed by the computer and the parameters can be changed by operation on a screen of the computer. In the invention, an appearance image of a measuring instrument is displayed on the screen of the computer and icons are displayed to correspond to predetermined positions of the appearance image. By selecting an icon displayed on the screen of the computer, a user can select a setting item in the same operation flow as when an actual measuring instrument is operated and can change the parameters while watching the screen.

According to an eleventh aspect of the invention, in the computer-readable medium according to the tenth aspect, the receiving of the changing of the parameter may include temporarily storing the changed parameter in the storage unit, and the transmitting of the changed parameter to the measuring instrument may include reading the changed parameter stored in the storage unit and transmitting the read parameter to the measuring instrument. According to this configuration, a changed parameter can be temporarily stored in the storage unit and then can be transmitted to the measuring instrument after waiting for a predetermined instruction.

According to a twelfth aspect of the invention, in the computer-readable medium according to the eleventh aspect, the transmitting of the changed parameter to the measuring instrument may include reading the parameters corresponding to all the setting items stored in the storage unit and collectively transmitting the read parameters to the measuring instrument. According to this configuration, changed parameters can be collectively transmitted to the measuring instrument after waiting for a predetermined instruction.

According to a thirteenth aspect of the invention, in the computer-readable medium according to the tenth aspect to the twelfth aspect, the receiving of the changing of the parameter may include temporarily storing the changed parameter in the storage unit and returning the changed parameter stored in the storage unit to the original parameter when a cancel instruction is received. According to this configuration, when a cancel instruction is given for a changed parameter which is temporarily stored in the storage unit, the changed parameter can be returned to the original parameter.

According to a fourteenth aspect of the invention, in the computer-readable medium according to the tenth aspect to the thirteenth aspect, the displaying of the setting items on the screen may include displaying an item for selecting a type of an attachment attached to the measuring instrument, and the receiving of the changing of the parameter may include receiving a dimension corresponding to the type of the attachment and calculating a calculation coefficient used for measuring using the attachment from the dimension.

According to this configuration, calculation coefficients used for measurement using an attachment attached to the measuring instrument can be automatically calculated depending on the type of the attachment. Accordingly, it is possible to easily set the calculation coefficients even when the attachment is replaced.

According to a fifteenth aspect of the invention, in the computer-readable medium according to the tenth aspect to the fourteenth aspect, the predetermined operation may further includes displaying the icons corresponding to the setting items, in which the parameter is able to be changed by only the computer, on the screen. According to this configuration, only the computer can change a parameter which cannot be changed by the measuring instrument.

According to a sixteenth aspect of the invention, in the computer-readable medium according to the tenth aspect to the fifteenth aspect, the predetermined operation may further includes: displaying an inhibition selection item, in which only the computer is able to select whether to inhibit the changing of the parameter corresponding to the setting item, on the screen; and transmitting information, which indicates that the changing of the parameter of the setting item corresponding to the inhibition selection item is inhibited in the measuring instrument, from the computer to the measuring instrument when a setting of inhibiting the changing of the parameter of the inhibition selection item is received.

According to this configuration, when the computer performs a setting of inhibiting changing of a parameter of a setting item corresponding to the inhibition selection item, the measuring instrument cannot change the parameter, that is, the changing of the parameter can be locked.

According to a seventeenth aspect of the invention, in the computer-readable medium according to the tenth aspect to the sixteenth aspect, the predetermined operation may further includes displaying a list display icon, which is used to display a list of the setting items temporarily stored in the storage unit and the parameters corresponding to the setting items on the screen, on the screen. According to this configuration, a list of the setting items and the parameters in the measuring instrument can be displayed on the screen of the computer.

According to an eighteenth aspect of the invention, in the computer-readable medium according to the tenth aspect to the seventeenth aspect, the receiving of the changing of the parameter includes displaying the setting item of the changed parameter on the screen in a format different from that of the setting items of which the parameters are not changed. According to this configuration, a setting item of which the parameter is changed can be easily checked from the screen display.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 5A to 5C are diagrams illustrating a display example when an icon of "OTHER" is selected;

DETAILED DESCRIPTION OF THE INVENTION

Hereinafter, embodiments of the invention will be described with reference to the accompanying drawings. In the following description and the drawings, the same elements as previously described with reference to the foregoing drawings will be referenced by the same reference signs and detailed description thereof will not be appropriately repeated.

Figure 1A:
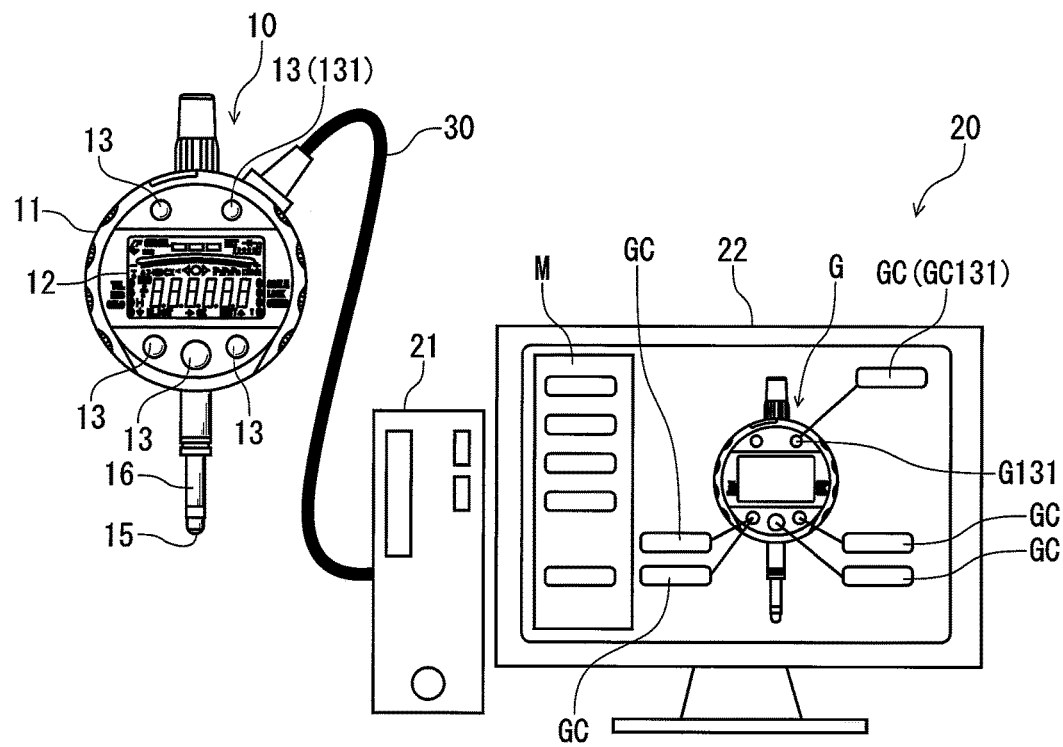
FIGS. 1A and 1B are diagrams illustrating a parameter setting method of a measuring instrument according to an embodiment of the invention.
Figure 1B:
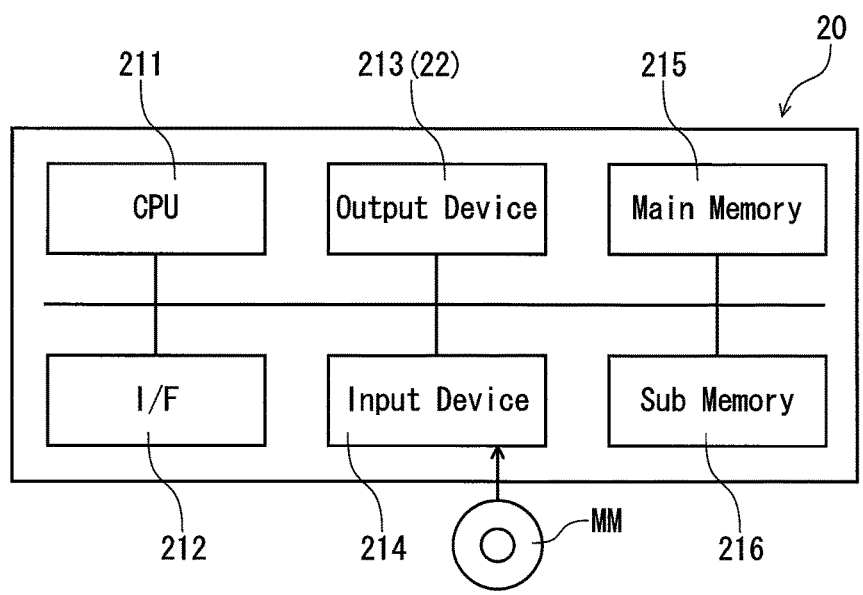

FIGS. 1A and 1B are diagrams illustrating a parameter setting method of a measuring instrument according to an embodiment of the invention. FIG. 1A illustrates a connection state between a measuring instrument 10 and a computer 20 and FIG. 1B is a block diagram illustrating the configuration of the computer 20.

As illustrated in FIG. 1A, the parameter setting method of the measuring instrument 10 according to this embodiment is a method of connecting the measuring instrument 10 and the computer 20 to each other, receiving an operation on a monitor 22 of the computer 20, and setting measurement-related parameters of the measuring instrument 10. The measuring instrument 10 and the computer 20 are connected to each other, for example, via a cable 30. A converter (not illustrated) may be installed between the measuring instrument 10 and the computer 20. The converter has a function of matching data structures and communication standards between the measuring instrument 10 and the computer 20. The measuring instrument 10 and the computer 20 may be connected to each other by wireless communication.

The measuring instrument 10 is an indicator that displays a measured value based on displacement of a gauge head 15 on a display unit 12. The measuring instrument 10 includes a body case 11 having a substantially circular front surface. A spindle 16 formed to move forward and backward relative to the body case 11 extends from the lower side of the body case 11. The gauge head 15 is attached to the tip of the spindle 16. The spindle 16 is reduced depending on a height of a measurement point by bringing the gauge head 15 into contact with the measurement point. A measured value or a calculated value based on the amount by which the spindle 16 is reduced, that is, the displacement of the gauge head 15, is displayed on the display unit 12.

Plural buttons 13 are disposed on the front surface of the body case 11. By appropriately operating the plural buttons 13, it is possible to switch a measurement mode or a setting mode or to set various measurement-related parameters (which includes newly setting and changing).

In this embodiment, the parameters of the measuring instrument 10 can be set using the computer 20 connected to the measuring instrument 10. The computer 20 includes a main body 21 and a monitor 22. As illustrated in FIG. 1B, the computer 20 includes a central processing unit (CPU) 211, an interface 212, an output unit 213, an input unit 214, a main storage unit 215, and a sub storage unit 216.

The CPU 211 controls the units by executing various programs. The interface 212 is a unit configured to input and output information to and from an external device. In this embodiment, information transmitted from the measuring instrument 10 is received by the computer 20 via the interface 212. Information from the computer 20 is transmitted to the measuring instrument 10 via the interface 212. The interface 212 is also a unit configured to connect the computer 20 to a local area network (LAN) or a wide area network (WAN).

The output unit 213 is a unit configured to output processing results of the computer 20. For example, the monitor 22 illustrated in FIG. 1A, a printer, or the like is used as the output unit 213. The input unit 214 is a unit configured to receive information from a user. A keyboard, a mouse, or the like is used as the input unit 214. The input unit 214 has a function of reading information recorded on a recording medium MM.

For example, a random access memory (RAM) is used as the main storage unit 215. A part of the sub storage unit 216 may be used as a part of the main storage unit 215. For example, a hard disk drive (HDD) or a solid state drive (SSD) is used as the sub storage unit 216. The sub storage unit 216 may be an external storage device connected thereto via a network.

In the parameter setting method of the measuring instrument 10 according to this embodiment, first, the measuring instrument 10 and the computer 20 are connected to each other, model information, measurement-related setting items, and parameters corresponding to the setting items which are stored in the measuring instrument 10 are read and are temporarily stored in the storage unit (for example, the main storage unit 215) of the computer 20.

Then, in the computer 20, an appearance image G of the measuring instrument 10 is displayed on the monitor 22 based on the model information read from the measuring instrument 10. Data of the appearance image G displayed on the monitor 22 is stored in the sub storage unit 216 or the like of the computer 20 in correlation with the model information in advance. The computer 20 reads the data of the appearance image G corresponding to the model information from the sub storage unit 216 and displays the read data on the monitor 22. The data of the appearance image G may be downloaded from an external server (such as a network server) to the computer 20 using the model information as a key.

The appearance image G equivalent to the appearance of the measuring instrument 10 connected to the computer 20 is displayed on the monitor 22. For the purpose of convenience of explanation, the size of the appearance image G displayed on the monitor in FIG. 1A is illustrated to be smaller than the size of the measuring instrument 10, but the appearance image G displayed on the monitor 22 is actually larger than the measuring instrument 10. The size of the appearance image G on the monitor 22 can be arbitrarily enlarged and reduced.

The computer 20 displays the appearance image G on the monitor 22 and also displays icons GC which are used for a user to select an operation on the monitor 22. The icons GC correspond to predetermined positions of the appearance image G displayed on the monitor 22. The icons GC enable operations related to actual positions of the measuring instrument 10 at the predetermined positions corresponding to the icons GC to be selected.

For example, when an icon GC131 indicates a button image G131 of the appearance image G, an operation which can be selected by an actual button 131 of the measuring instrument 10 corresponding to the button image G131 is assigned to the icon GC131. Accordingly, by allowing a user to select an icon GC corresponding to the same position as actually operated in the measuring instrument 10, the same operation as in the actual measuring instrument 10 is obtained on the monitor 22.

When selection of an icon GC by the user is received, the computer 20 displays a setting item, which can be selected by the operation on the measuring instrument 10 related to the predetermined position corresponding to the icon GC, on the monitor 22.

The computer 20 receives setting of a parameter corresponding to the setting item displayed on the monitor 22 and transmits the changed parameter to the measuring instrument 10. Accordingly, the user can select the setting item in the same operation flow as when the actual measuring instrument 10 is operated by selecting the icon GC displayed on the monitor 22 of the computer 20, and can change a desired parameter while watching the monitor 22, and can transmit the changed parameter to the measuring instrument 10. The user can easily set parameters by selecting the icons GC while watching the monitor 22 which is larger than the display unit 12 of the measuring instrument 10.

The parameter setting method of the measuring instrument 10 according to this embodiment is embodied, for example, by a program (parameter setting program) which is executed by the computer 20.

Figure 2:
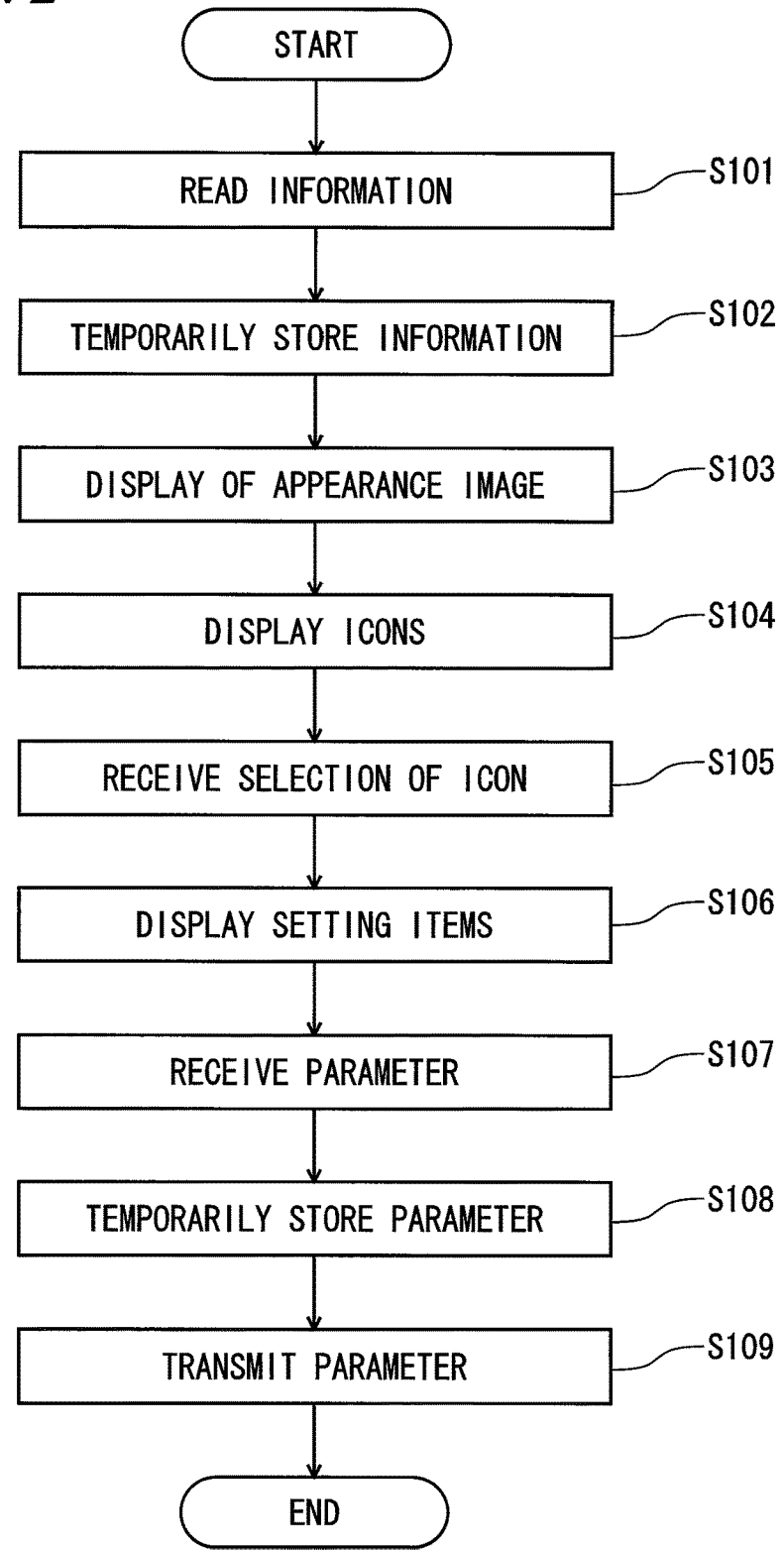
FIG. 2 is a flowchart illustrating an example of a flow of a parameter setting program of the measuring instrument.

FIG. 2 is a flowchart illustrating an example of a flow of a parameter setting program of the measuring instrument.

First, in step S101 of reading information, a process of reading model information, setting items, and parameters, which are stored in the measuring instrument 10, to the computer 20 from the measuring instrument 10 connected to the computer 20. The computer 20 gives an instruction to the measuring instrument 10 via the interface 212 and reads information sent from the measuring instrument 10 via the interface 212.

Then, in step S102 of temporarily storing the information, a process of temporarily storing the model information, the setting items, and the parameters, which have read from the measuring instrument 10, in the storage unit of the computer 20 is performed. The computer 20 temporarily stores the information read through the interface 212, for example, in the main storage unit 215.

Then, in step S103 of displaying an appearance image, a process of displaying an appearance image G of the measuring instrument 10 corresponding to the model information on the monitor 22 is performed. In step S104 of displaying icons, a process of displaying the icons GC, which is used to select an operation on the monitor 22, in correlation with predetermined positions of the appearance image G along with the appearance image G is performed. Accordingly, as illustrated in FIG. 1A, the appearance image and the icons GC corresponding to the actual measuring instrument 10 are displayed on the monitor 22.

Then, in step S105 of receiving selection of an icon, a process of receiving selection of an icon GC displayed on the monitor 22 by the user. The user selects a desired icon GC by operating a mouse or the like (clicking a button) while watching the display on the monitor 22. The computer 20 receives the selection of the icon GC.

Then, in step S106 of displaying setting items, a process of displaying a setting item, which can be selected by an operation on the measuring instrument 10 related to the predetermined position corresponding to the selected icon GC, on the monitor 22. By allowing the user to select a desired icon GC using a mouse or the like, the same setting item as operated in the actual measuring instrument 10 can be displayed on the monitor 22.

Then, in step S107 of receiving a parameter, a process of receiving changing of a parameter corresponding to the setting item displayed on the monitor 22 is performed. The user sets the parameter corresponding to the desired setting items while watching the display on the monitor 22. The computer 20 receives the parameter set by the user.

Then, in step S108 of temporarily storing the parameter, a process of temporarily storing the parameter set by the user, for example, in the main storage unit 215 is performed. When the user gives a cancel instruction after a new parameter is temporarily stored, the new parameter may be returned to the original parameter.

Then, in step S109 of transmitting a parameter, a process of transmitting the new parameter which has been temporarily stored to the measuring instrument 10 is performed. The computer 20 transmits the new parameter stored, for example, in the main storage unit 215 to the measuring instrument 10 via the interface 212. The measuring instrument 10 receives and stores the new parameter transmitted from the computer 20.

By using this program, the user can easily set a parameter of a desired setting item while watching details displayed on the monitor 22. The same appearance image G as the actual measuring instrument 10 is displayed on the monitor 22 and the same operation as the operation on the actual measuring instrument 10 can be performed by selecting the icon GC. Accordingly, the user can set parameters without any discomfort using an excellent graphical user interface (GUI).

In the flowchart illustrated in FIG. 2, the process of step S108 of temporarily storing the set parameter is performed, but the new parameter may be rapidly transmitted to the measuring instrument 10 by the transmission of step S109 after the process of step S107 of receiving the parameter is performed without performing the process of step S108.

Specific screen transitions of the monitor 22 will be described below.

Figure 3A:
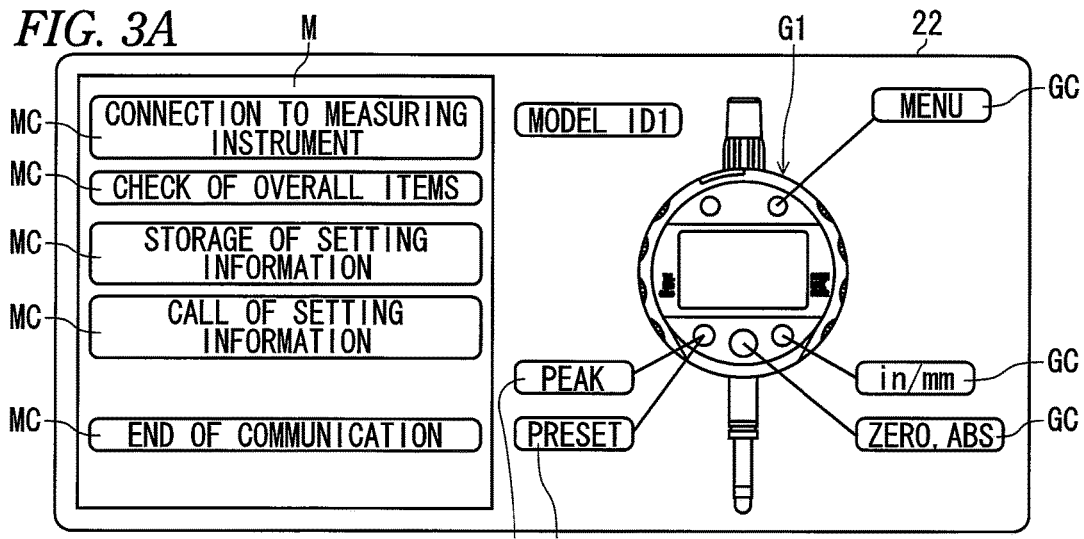
FIGS. 3A to 3C are diagrams illustrating a display example of an appearance image.
Figure 3B:
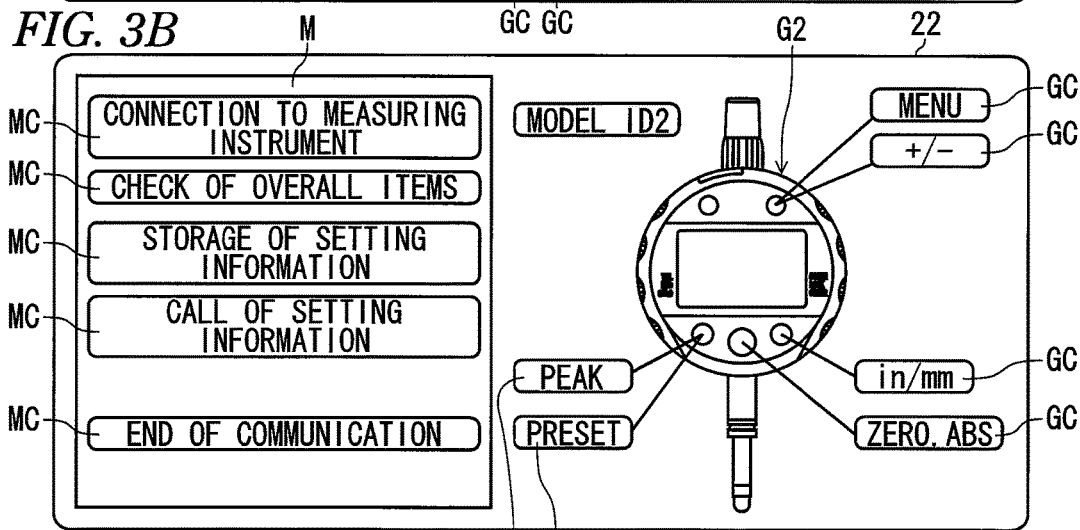
Figure 3C:
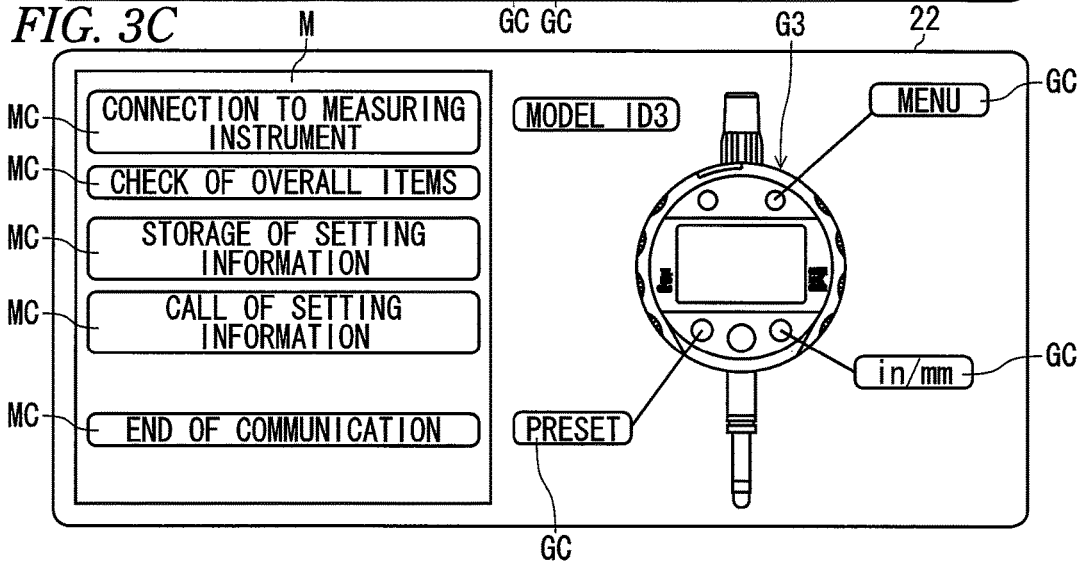

FIGS. 3A to 3C are diagrams illustrating a display example of an appearance image. FIG. 3A illustrates an appearance image G1 of model ID1, FIG. 3B illustrates an appearance image G2 of model ID2, and FIG. 3C illustrates an appearance image G3 of model ID3.

The computer 20 reads model information of the measuring instrument 10 and displays an appearance image G of the measuring instrument 10 on the monitor 22 based on the model information. For example, model ID1 illustrated in FIG. 3A is a computing type capable of performing a calculation operation based on a measured value. Model ID2 illustrated in FIG. 3B is a peak detection type of detecting a peak of a measured value. Model ID3 illustrated in FIG. 3C is a cylinder gauge type of measuring an inner diameter or an outer diameter.

The computer 20 displays icons GC, which are required for the model of the measuring instrument 10, on the monitor 22 based on the model information. Since the setting items vary depending on the models, the appearance images G1 to G3 depending on the models and the icons GC required for the models are displayed on the monitor 22.

The icons GC illustrated in FIGS. 3A to 3C are displayed to correspond to positions of buttons of the appearance images G1 to G3. Accordingly, when a desired icon GC is selected on the monitor 22, the same operation as when the button 13 of the measuring instrument 10 corresponding to the icon GC is selected is performed on the monitor 22.

A menu M may be displayed on the monitor 22. Icons MC for selecting functions are displayed in the menu M. Icons MC for performing functions common to applications are displayed in the menu M.

Figure 4A:
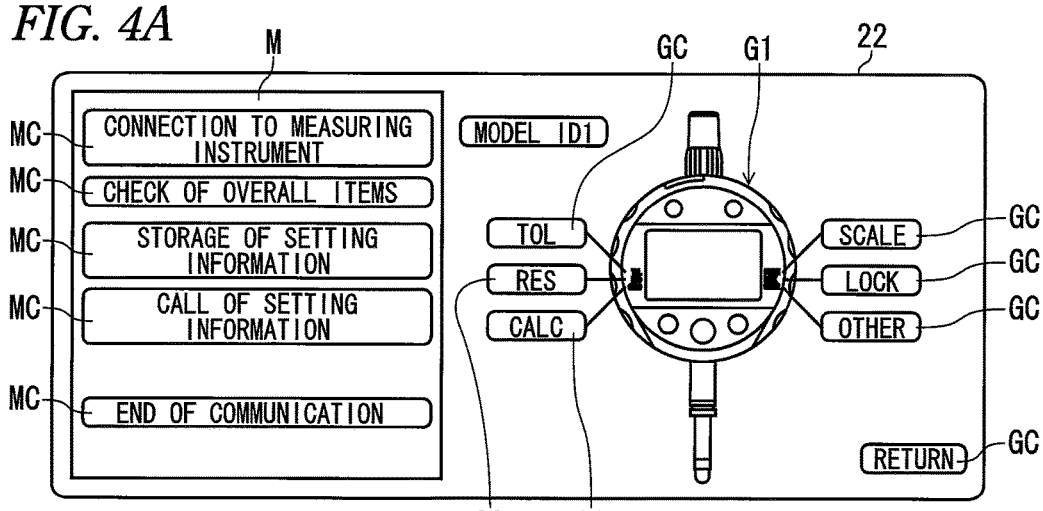
FIGS. 4A to 4C are diagrams illustrating a display example when an icon of "MENU" is selected.
Figure 4B:
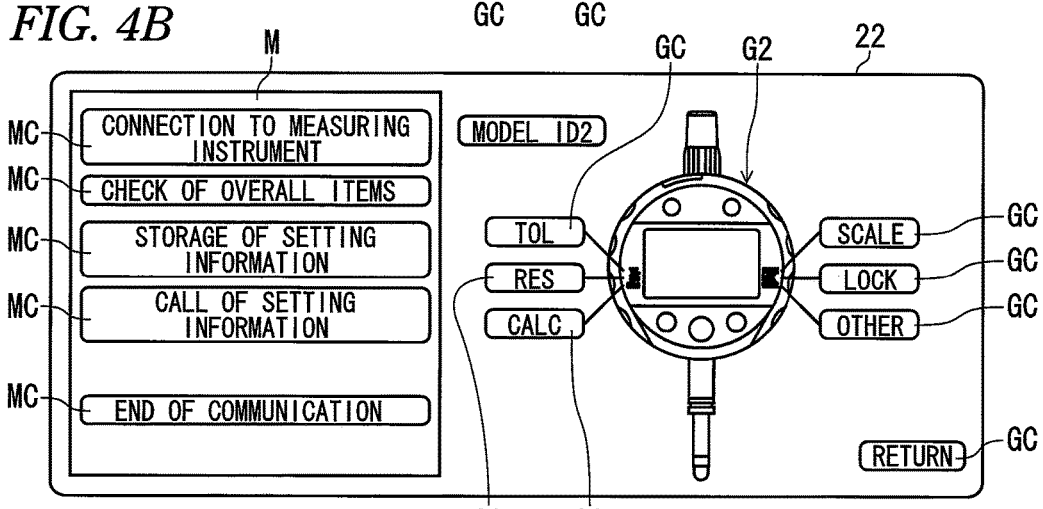
Figure 4C:
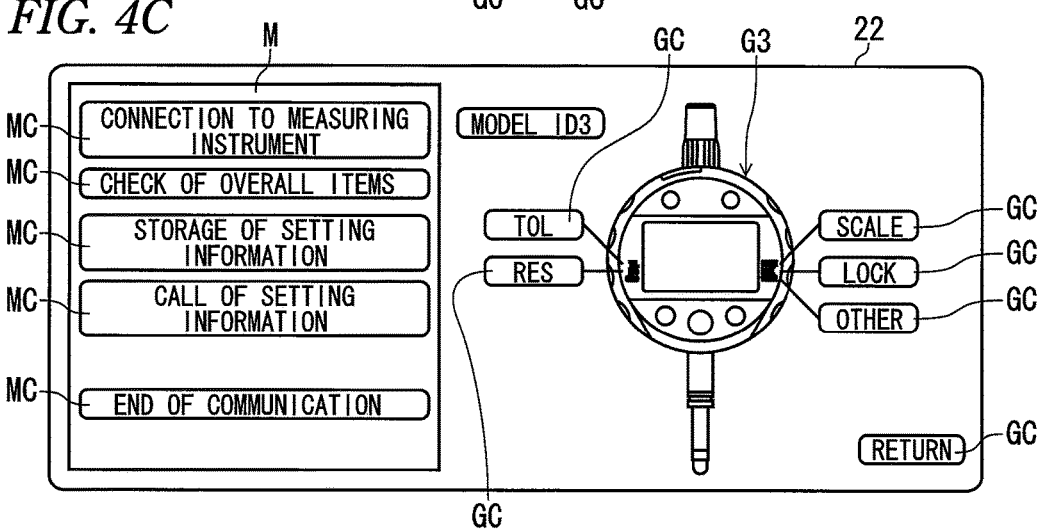

FIGS. 4A to 4C are diagrams illustrating a display example when the icon of "MENU" is selected. FIG. 4A illustrates a display example of model ID1, FIG. 4B illustrates a display example of model ID2, and FIG. 4C illustrates a display example of model ID3.

By selecting the icon of "MENU," the icons GC of the setting items corresponding to the appearance images G1 to G3 are displayed on the monitor 22. Only the icons GC of the setting items which can be selected in each model of the appearance images G1 to G3 are displayed on the monitor 22.

FIGS. 5A to 5C are diagrams illustrating a display example when the icon of "OTHER" is selected. FIG. 5A illustrates a display example of model ID1, FIG. 5B illustrates a display example of model ID2, and FIG. 5C illustrates a display example of model ID3.

By selecting the icon of "OTHER," the icons GC of other setting items corresponding to the appearance images G1 to G3 are displayed on the monitor 22. Only the icons GC of the other setting items which can be selected in each model of the appearance images G1 to G3 are displayed on the monitor 22. By selecting the icon of "OTHER," the icons GC of the setting items other than the main setting items are displayed.

Setting of parameters corresponding to the specific screen transitions will be described below.

FIGS. 6A to 12 are diagrams illustrating examples of specific screen transitions and examples of parameter setting.

Figure 6A:
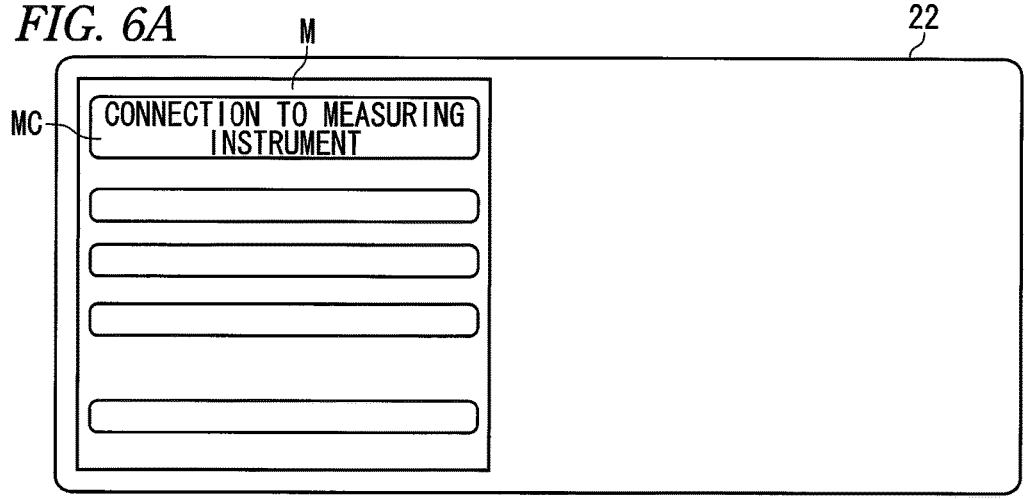
FIGS. 6A to 6C are diagrams illustrating an example of specific screen transition and an example of parameter setting.

First, when the parameter setting program is started by the computer 20, a basic screen is driven as illustrated in FIG. 6A. On the basic screen, an icon MC of "CONNECTION TO MEASURING INSTRUMENT" is displayed in the menu M.

Figure 6B:
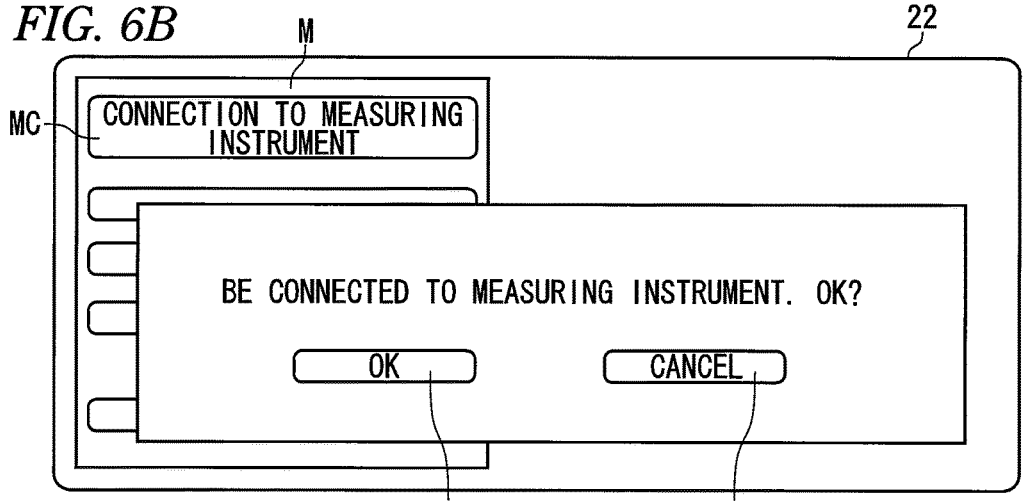

When the icon MC of "CONNECTION TO MEASURING INSTRUMENT" in the menu M is selected, a window for promoting connection to the measuring instrument 10 is displayed in a pop-up manner as illustrated in FIG. 6B. When a button of "OK" is selected in a state in which the measuring instrument 10 and the computer 20 are connected to each other, for example, via a cable 30, the model information, the setting items, and the parameters sent from the measuring instrument 10 are read to the computer 20.

Figure 6C:
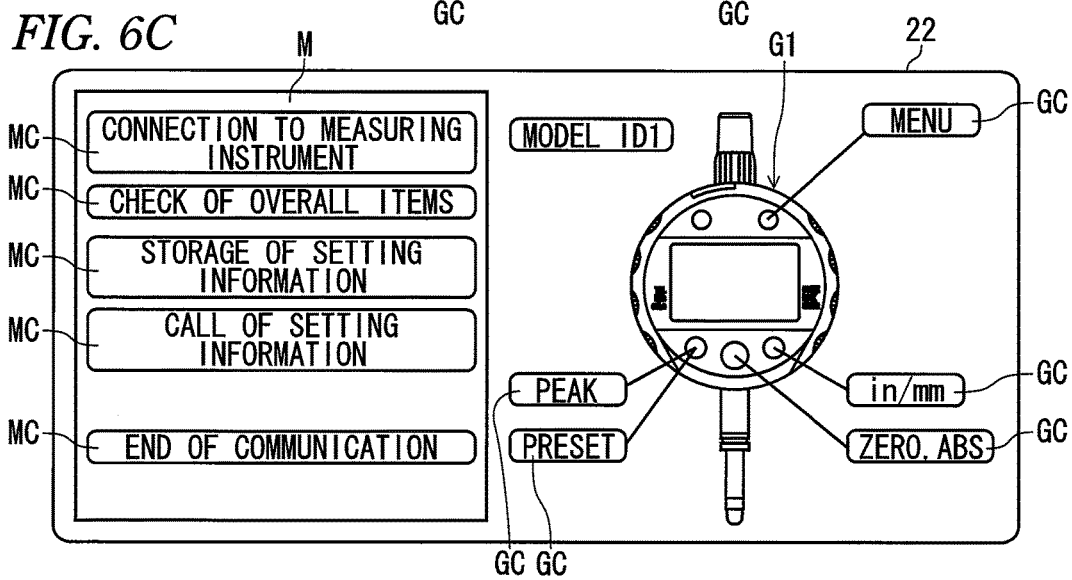

As illustrated in FIG. 6C, an appearance image G based on the model information read to the computer 20 and icons GC corresponding to the model are displayed on the monitor 22. Various icons MC of the menu M are displayed along with the appearance image G and the icons GC.

In model ID1, icons GC of "MENU," "PEAK," "PRESET," "in/mm," "ZERO, ABS" are displayed to correspond to the positions of buttons of the appearance image G1. In the menu M, icons MC of "CHECK OF OVERALL ITEMS," "STORAGE OF SETTING INFORMATION," "CALL OF SETTING INFORMATION," and "END OF COMMUNICATION" are displayed in addition to the icon MC of "CONNECTION TO MEASURING INSTRUMENT."

In the following description, the screen transition and the parameter setting in model ID1 which is a computing type are exemplified, but the screen transitions and the parameter setting in model ID2 and model ID3 will be appropriately exemplified. In model ID2, when the measuring instrument 10 is connected to the computer 20, the appearance image G2 illustrated in FIG. 3B is displayed. In model ID3, the appearance image G3 illustrated in FIG. 3C is displayed.

The screen transition when representative icons GC and MC are selected will be described below.

Figure 7A:
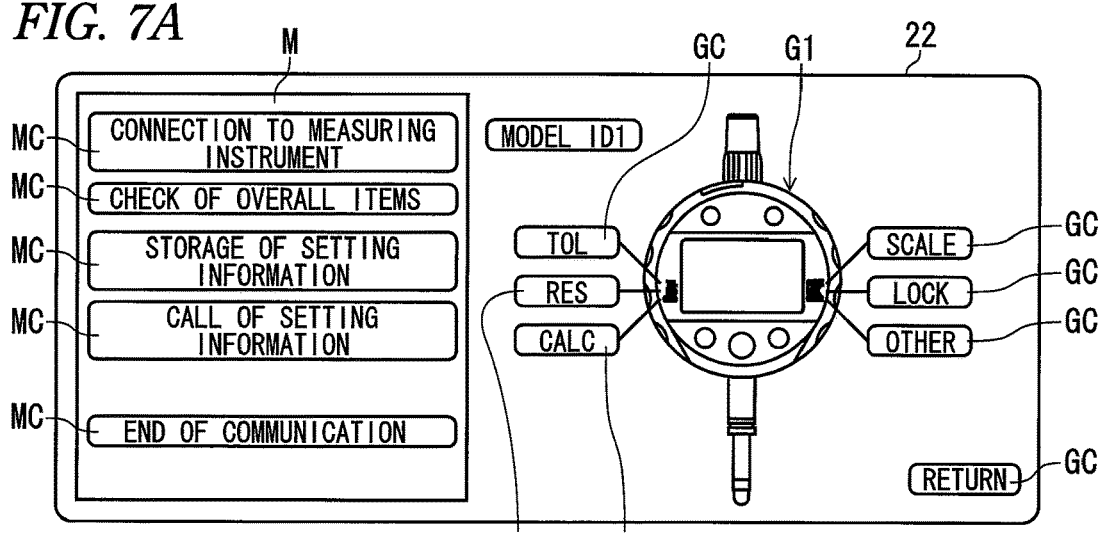
FIGS. 7A to 7C are diagrams illustrating an example of specific screen transition and an example of parameter setting.

When the icon MC of "MENU" illustrated in FIG. 6C is selected, the screen illustrated in FIG. 7A is displayed. In model ID1, icons GC of "TOL," "RES," "CALC," "SCALE," "LOCK," "OTHER," and "RETURN" are displayed.

Figure 7B:
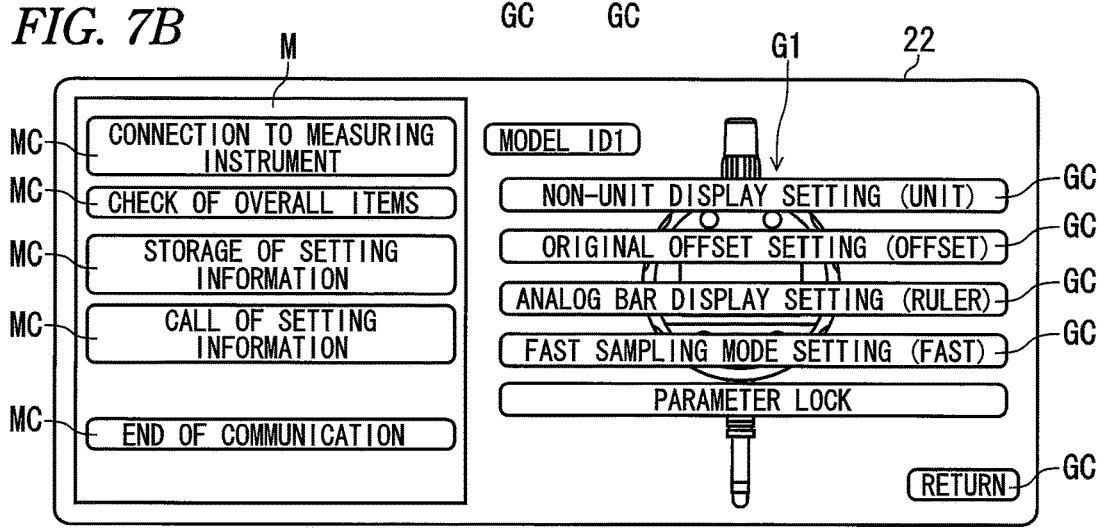

When the icon GC of "RETURN" is selected, any screen can be returned to the immediately previous screen display. When the icon GC of "OTHER" is selected, the screen illustrated in FIG. 7B is displayed. In model ID1, icons GC of "NON-UNIT DISPLAY SETTING (UNIT)," "ORIGINAL OFFSET SETTING (OFFSET)," "ANALOG BAR DISPLAY SETTING (RULER)," "FAST SAMPLING MODE SETTING (FAST),", and "PARAMETER ER LOCK" are displayed.

Figure 7C:
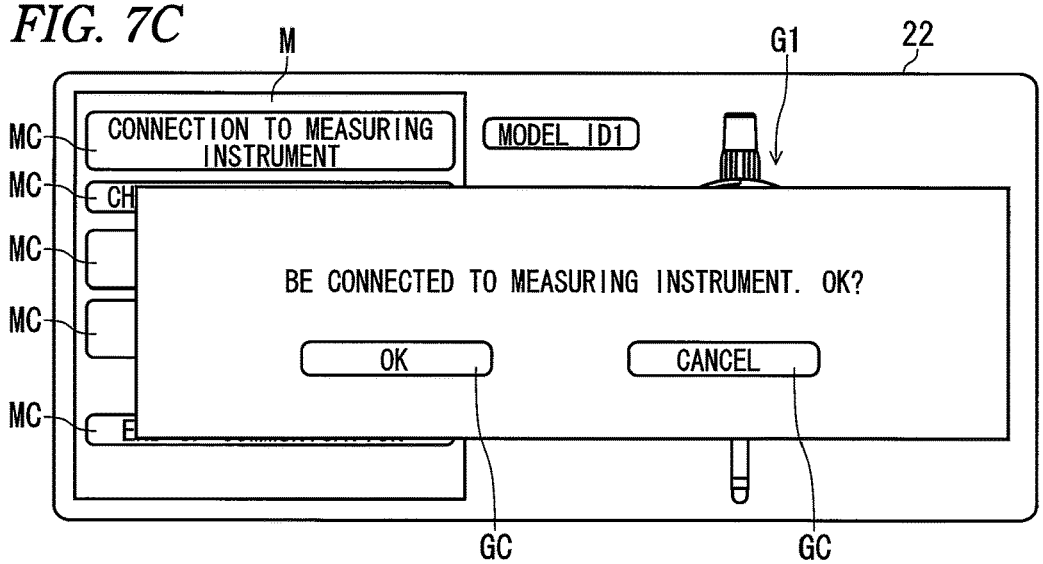

Here, when the icon MC of "END OF COMMUNICATION" is selected in the menu M, a window for checking the end of communication is displayed in a pop-up manner as illustrated in FIG. 7C. When the icon GC of "OK" is selected in the window, the communication ends. On the other hand, when the icon GC of "CANCEL" is selected, the communication does not end and the popped-up window is closed.

Figure 8A:
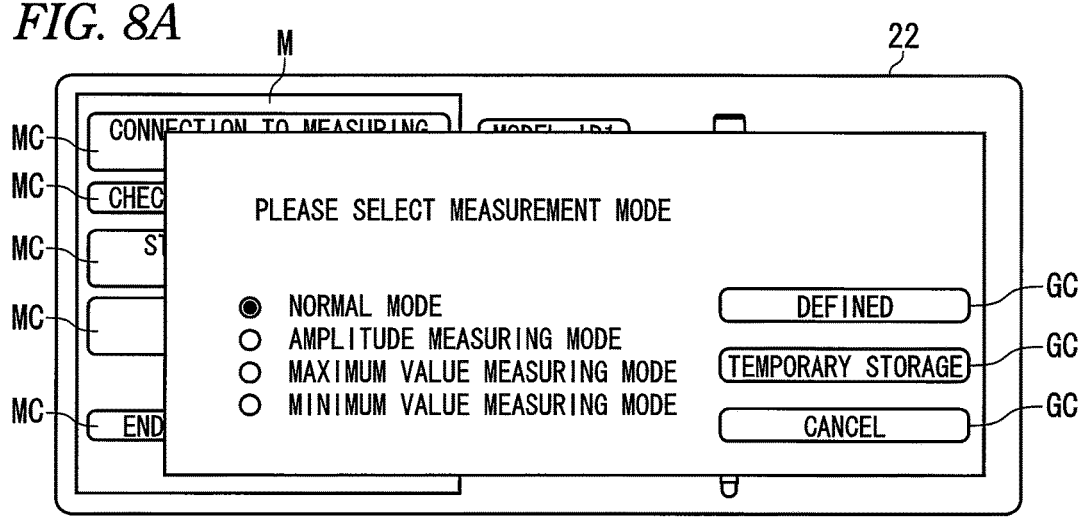
FIGS. 8A to 8C are diagrams illustrating an example of specific screen transition and an example of parameter setting.

When the icon GC of "PEAK" illustrated in FIG. 6C is selected, a window for setting a peak is displayed in a pop-up manner as illustrated in FIG. 8A. Radio buttons for selecting measurement modes are displayed in the window for setting a peak. When a radio button indicating a desired measurement mode is selected and then the icon GC of "DEFINED" is selected, the set parameter (measurement mode) is transmitted to the measuring instrument 10. By transmitting the parameter from the computer 20 to the measuring instrument 10, a new parameter is set in the measuring instrument 10.

When the icon GC of "TEMPORARY STORAGE" is selected, the set parameter (measurement mode) is temporarily stored in the storage unit (for example, the main storage unit 215) of the computer 20 and the window is closed. Here, the parameter is not transmitted to the measuring instrument 10 by only the temporary storage. When the icon GC of "CANCEL" is selected, the window is closed without doing anything. In this case, the setting item is maintained as the original parameter.

Figure 8B:
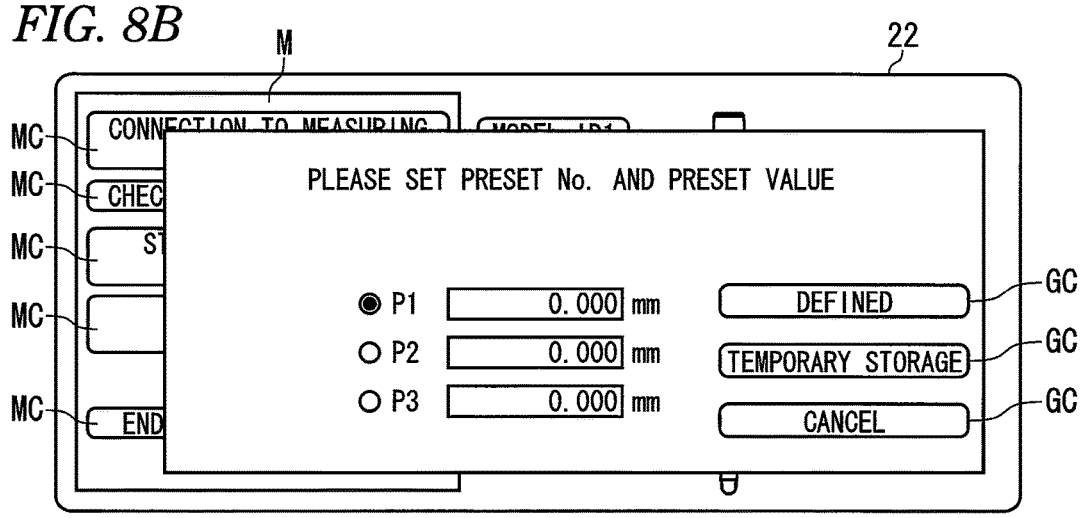

When the icon GC of "PRESET" illustrated in FIG. 6C is selected, a window for presetting is displayed in a pop-up manner as illustrated in FIG. 8B. Radio buttons for selecting a preset number (PRESET No.) and text boxes for inputting preset values (PRESET values) are displayed in the window for presetting. Here, the display of a unit is matched with the setting when a parameter is read from the measuring instrument 10 to the computer 20. When the parameter of the unit is changed after the parameter is read, the changed unit is displayed.

After the parameter of presetting is set in the window for presetting, any of "DEFINED," "TEMPORARY STORAGE," and "CANCEL" is selected. The process when any icon of "DEFINED," "TEMPORARY STORAGE," and "CANCEL" is selected is the same as described above.

Figure 8C:
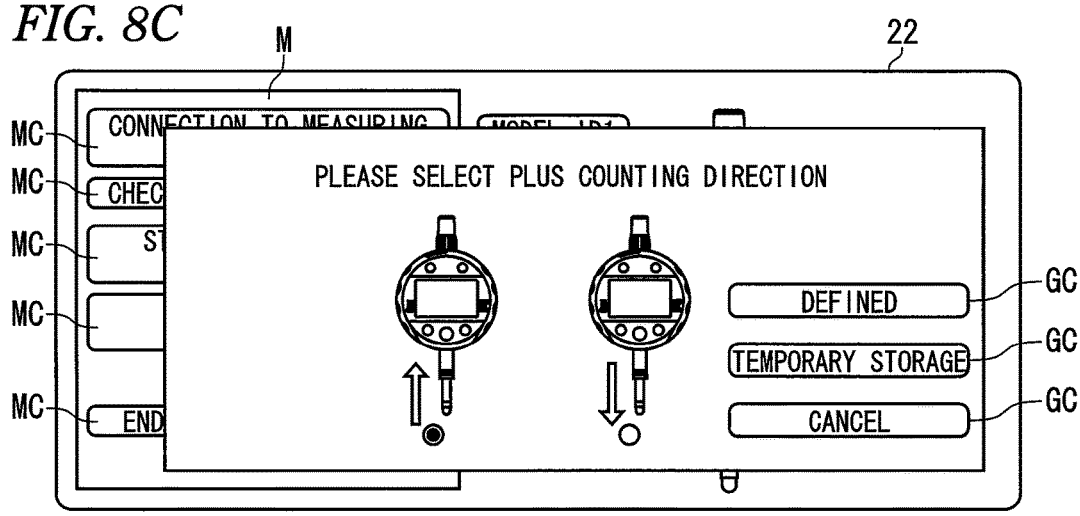

Here, when the icon GC of "+/−" is selected in the appearance image G2 of model ID2 illustrated in FIG. 3B, a window for setting a counting direction is displayed in a pop-up manner as illustrated in FIG. 8C. Radio buttons for selecting a direction of the gauge head in which the counted value is counted in a plus direction are displayed in the window. After the radio button in the direction in which the counted value is counted in the plus direction is selected, any of "DEFINED," "TEMPORARY STORAGE," and "CANCEL" is selected. The process when any icon of "DEFINED," "TEMPORARY STORAGE," and "CANCEL" is selected is the same as described above.

Figure 9A:
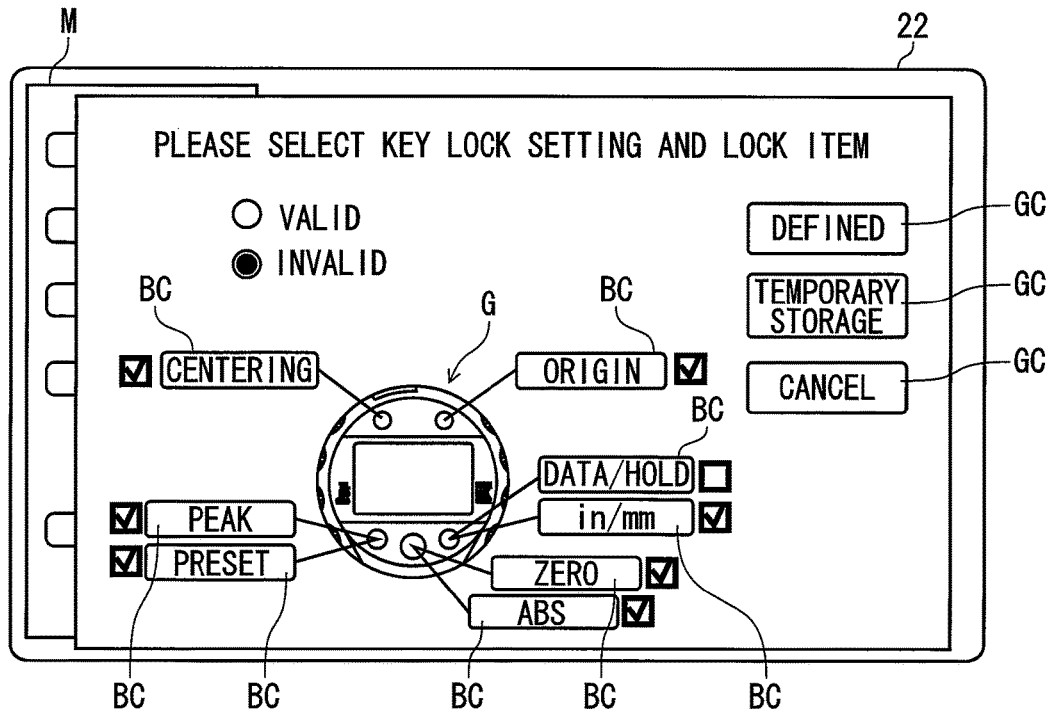
FIGS. 9A and 9B are diagrams illustrating an example of specific screen transition and an example of parameter setting.

When the icon GC of "LOCK" illustrated in FIG. 7A is selected, a window for setting key lock is displayed in a pop-up manner as illustrated in FIG. 9A. Radio buttons for selecting valid/invalid of the key lock are displayed in the window. The appearance image G corresponding to the model and button marks BC corresponding to the positions of the buttons of the appearance image G are displayed. A check box is displayed beside each button mark BC. The button indicated by the button mark BC selected using the check box sets the key lock depending on the setting of valid/invalid of the key lock.

After the parameter of the key lock is set in the window for setting the key lock, any of "DEFINED," "TEMPORARY STORAGE," and "CANCEL" is selected. The process when any icon of "DEFINED," "TEMPORARY STORAGE," and "CANCEL" is selected is the same as described above. In the measuring instrument 10, the button in which the key lock is validly set does not react in spite of pressing thereon.

The button mark BC corresponding to the button in which the key lock is set differs depending on the models. Here, the button in which the key lock is set can be subjected to release of the key lock by a predetermined operation on the measuring instrument 10.

Figure 9B:
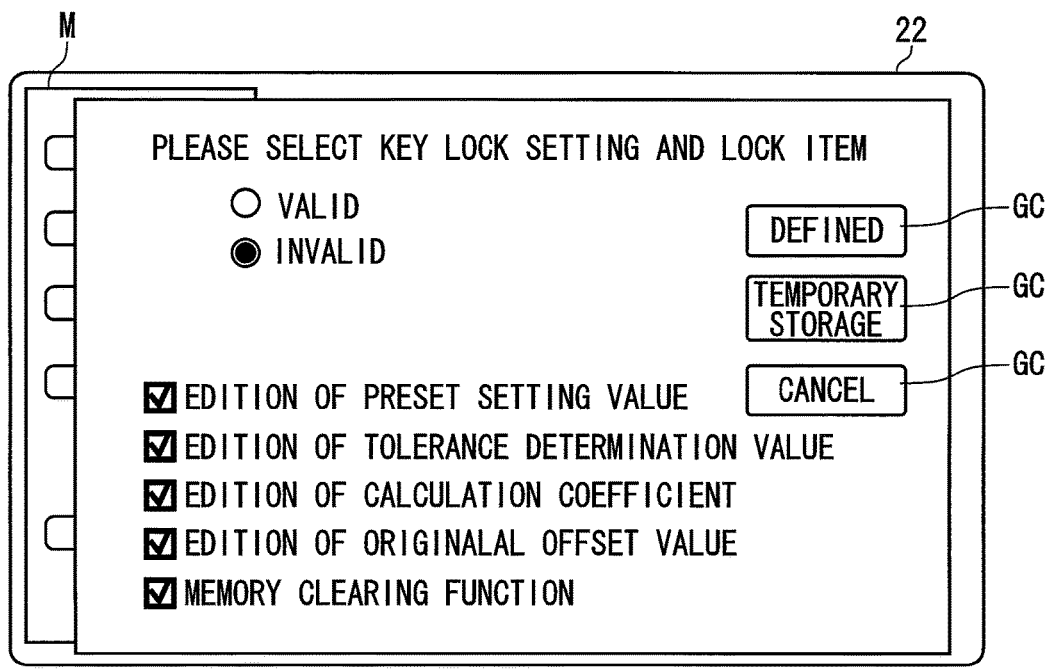

When the icon GC of "PARAMETER LOCK" illustrated in FIG. 7B is selected, a window for setting the parameter lock is displayed in a pop-up manner as illustrated in FIG. 9B. Radio buttons for selecting valid/invalid of the parameter lock are displayed in the window. In addition, check boxes of the parameters to be subjected to the parameter lock are displayed depending on the models.

This parameter lock is different from the above-mentioned key lock and is setting for determining whether to change the parameter in only the computer 20. As for the parameter subjected to the parameter lock in the computer 20, the parameter lock cannot be released in the measuring instrument 10. By setting the parameter lock, it is possible to prevent a parameter from being erroneously changed in the measuring instrument 10 or to protect the parameter which is not wanted to be changed in the measuring instrument 10.

Figure 10:
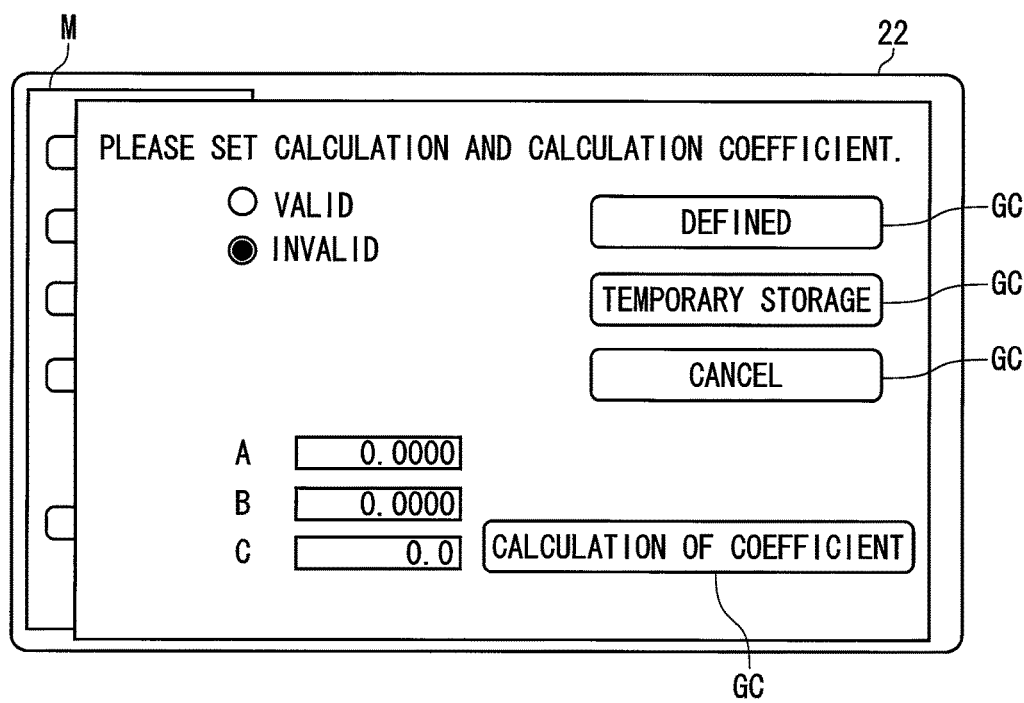
FIG. 10 is a diagram illustrating an example of specific screen transition and an example of parameter setting.

When the icon GC of "CALC" illustrated in FIG. 7A is selected, a window for setting a calculation function is displayed in a pop-up manner as illustrated in FIG. 10. Radio buttons for selecting valid/invalid of the calculation function are displayed in the window. Text boxes of calculation coefficients A, B, and C are displayed. The values of the calculation coefficients A, B, and C may be automatically calculated by selecting the icon GC of "CALCULATION OF COEFFICIENT" and performing predetermined setting.

Figure 11A:
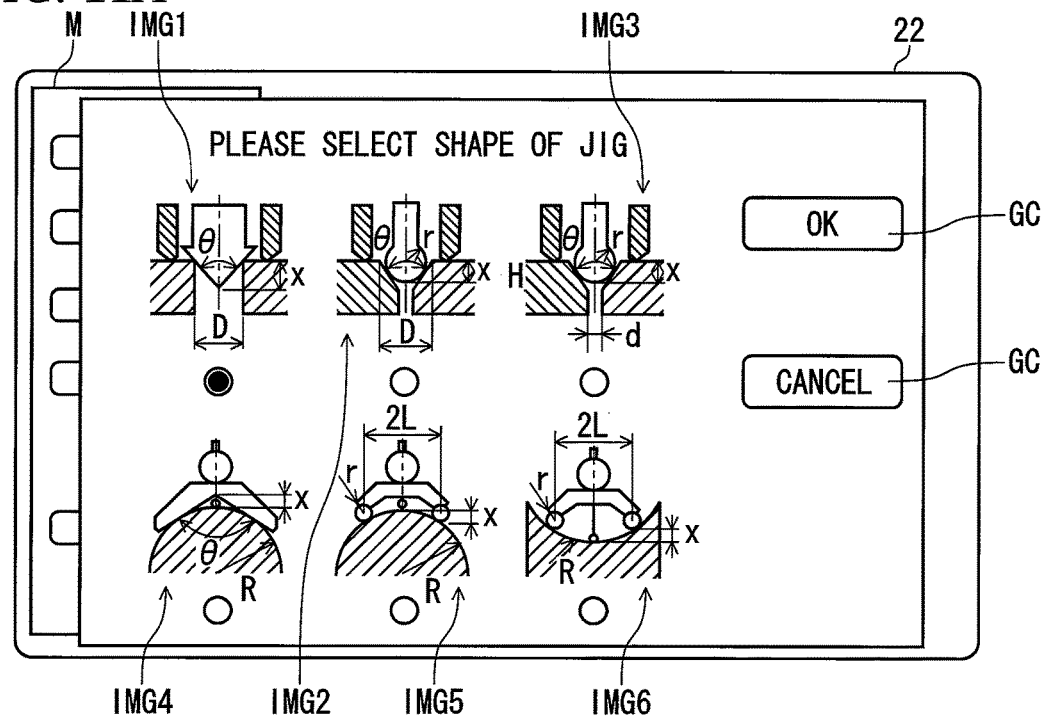
FIGS. 11A and 11B are diagrams illustrating an example of specific screen transition and an example of parameter setting.

When the icon GC of "CALCULATION OF COEFFICIENT" is selected, a window for selecting jigs is displayed in a pop-up manner as illustrated in FIG. 11A. The jigs are an example of the attachment in the claims.

In the computing type measuring instrument 10, the calculation coefficients A, B, and C are set depending on the jig attached to the measuring instrument 10, and a desired calculation result can be obtained depending on the measurement details using the jig.

In the window illustrated in FIG. 11A, images IMG1 to IMG6 of jigs to be attached to the measuring instrument 10 depending on the measurement details and radios buttons for selection are displayed.

The measurement details indicated by the jig image IMG1 are measurement of a hole diameter D. In this measurement, a jig having a conical gauge head is attached to the measuring instrument 10. Here, when an angle by which the conical shape of the gauge head is broadened is defined as θ and the distance from a reference position to the tip of the gauge head when the conical gauge head comes in contact with a mouth of a hole is defined as x, the hole diameter D can be calculated using the following computing expression.

$$D=A \times x$$

Calculation coefficient A is calculated by A=−2 tan(θ/2).

The measurement details indicated by the jig image IMG2 are measurement of a hole diameter D of a mouth of a countersink. In this measurement, a jig having a spherical gauge head is attached to the measuring instrument 10. Here, when the radius of the spherical shape of the gauge head is defined as r, the angle of the countersink is defined as θ, and the distance from a reference position to the tip of the gauge head when the spherical gauge head comes in contact with a mouth of a countersink is defined as x, the hole diameter D can be calculated using the following computing expression.

$$D=Ax+B$$

Calculation coefficient A is calculated by A=−2 tan(θ/2).

Calculation coefficient B is calculated by B=2r(1/cos(θ/2))−tan(θ/2)).

The measurement details indicated by the jig image IMG3 are measurement of a height H of a countersink. In this measurement, a jig having a spherical gauge head is attached to the measuring instrument 10. Here, when the radius of the spherical shape of the gauge head is defined as r, the angle of the countersink is defined as θ, the hole diameter of an inside hole of the countersink is defined as d, and the distance from a reference position to the tip of the gauge head when the spherical gauge head comes in contact with a mouth of a countersink is defined as x, the depth H can be calculated using the following computing expression.

$$D=Ax+B$$

Calculation coefficient A is A=−1.

Calculation coefficient B is calculated by B=r(1/cos(θ/2)−1)−d/2 tan(θ/2)).

The measurement details indicated by the jig images IMG4 and IMG5 are measurement of an outer diameter (radius) of a round object. The suitable shape of the jig varies depending on the object to be measured. Here, when the angle of V-shaped arms in the jig image IMG4 is defined as θ, the distance from a reference position to the tip of the gauge head is defined as x, and the radius of the round object is defined as R, the radius R can be calculated using the following computing expression.

$$R=Ax$$

Calculation coefficient A is calculated by A=−(sin(θ/2))/(1−sin(θ/2)).

When the distance between two contact balls in the jig image IMG5 is defined as 2L, the radius of the contact balls is defined as r, and the distance between the gauge head and the contact balls when the gauge head comes in contact with the surface of a round object is defined as x, the radius R of the round object can be calculated using the following computing expression.

$$R=Ax+B+Cx^{-1}$$

Calculation coefficient A is ½.

Calculation coefficient B is −r.

Calculation coefficient C is calculated by $L^2/2$.

The measurement details indicated by the jig image IMG6 are measurement of an inner diameter (radius) of a round object. The jig used in this measurement is the same as the jig used in the measurement of the image IMG5. Here, when the distance between two contact balls in the jig image IMG6 is defined as 2L, the radius of the contact balls is defined as r, and the distance between the gauge head and the contact balls when the gauge head comes in contact with the surface of a round object is defined as x, the radius R of the round object can be calculated using the following computing expression.

$$R=Ax+B+Cx^{-1}$$

Calculation coefficient A is −½.

Calculation coefficient B is r.

Calculation coefficient C is calculated by $-L^2/2$.

In this way, since calculation coefficients A, B, and C differ depending on the selected jig and the measurement details, it is necessary to set calculation coefficients A, B, and C depending on the measurement details to be applied. In the window illustrated in FIG. 11A, for example, when the radio button of the jig image IMG1 is selected and the icon GC of "OK" is selected, the window illustrated in FIG. 11B is displayed in a pop-up manner.

In this window, the image IMG1 selected by the radio button is displayed. Accordingly, it is possible to easily recognize that the measurement details using the jig of the image IMG1 are selected. A text box for inputting a parameter (the value of θ herein) required for calculating calculation coefficients A, B, and C is displayed depending on the measurement details using the jig of the image IMG1. The display item of the text box is changed depending on the jig of the selected measurement details.

When the value of θ is input to the text box and the icon GC of "calculation" is selected, values are automatically input to the text boxes of calculation coefficients A, B, and C in the window. In the jig of the image IMG1, when the value of the angle θ of the conical shape is input, calculation coefficient A is automatically calculated by the expression (here, A=2 tan(θ/2)) indicating calculation coefficient A corresponding to the measurement details and is automatically input to the text box. "0" is automatically input for the coefficients (here, calculation coefficients B and C) not used in the computing expression.

Figure 11B:
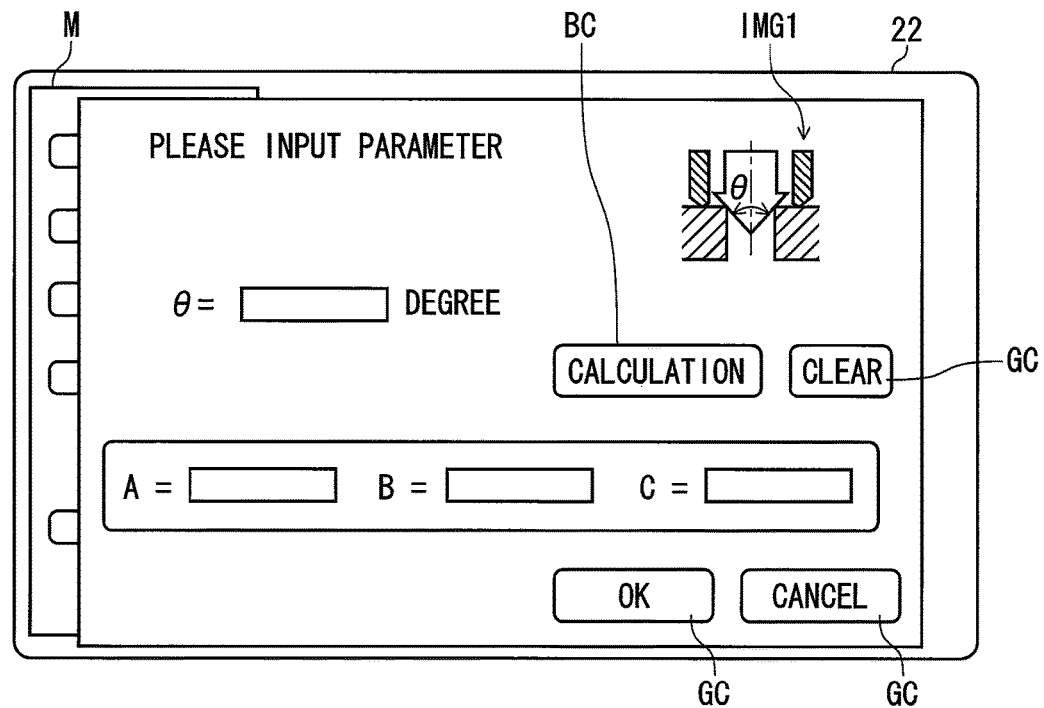

When the icon GC of "OK" is selected in the window illustrated in FIG. 11B after calculation coefficients A, B, and C are calculated, the screen is returned to the display window illustrated in FIG. 10. After the calculation, the previous calculation results of calculation coefficients A, B, and C in the window are input.

When the icon MC of "STORAGE OF SETTING INFORMATION" in the menu M illustrated in FIG. 6C is selected, the parameters temporarily stored in the storage unit (for example, the main storage unit 215) of the computer 20 can be stored, for example, as text data (parameter set) in the storage unit (for example, the sub storage unit 216) of the computer 20.

In order to call the parameter set stored in the computer 20 by selecting the icon MC of "STORAGE OF SETTING INFORMATION," the icon MC of "CALL OF SETTING INFORMATION" in the menu M illustrated in FIG. 6C can be selected. Various parameters of the read parameter set can be referred to, changed, and transmitted by selecting the above-mentioned icon MC. A list display to be described later may be used.

When the functions of "STORAGE OF SETTING INFORMATION" and "CALL OF SETTING INFORMATION" are used, it is possible to easily set the same parameters for plural measuring instruments 10 of the same type. For example, in a state in which parameters are set for a certain measuring instrument 10, the parameter set is stored in the computer 20. Thereafter, another measuring instrument 10 is connected to the computer 20, the previously-stored parameter set is called, and various parameters in the parameter set are transmitted to the measuring instrument 10 connected to the computer 20 and are stored therein. When the same parameters are set for another measuring instrument 10, the measuring instrument 10 is connected to the computer 20 and various parameters of the called parameter set are transmitted. By repeating this process, the number of operations of setting the same parameters for plural measuring instruments 10 can be greatly reduced.

Figure 12:
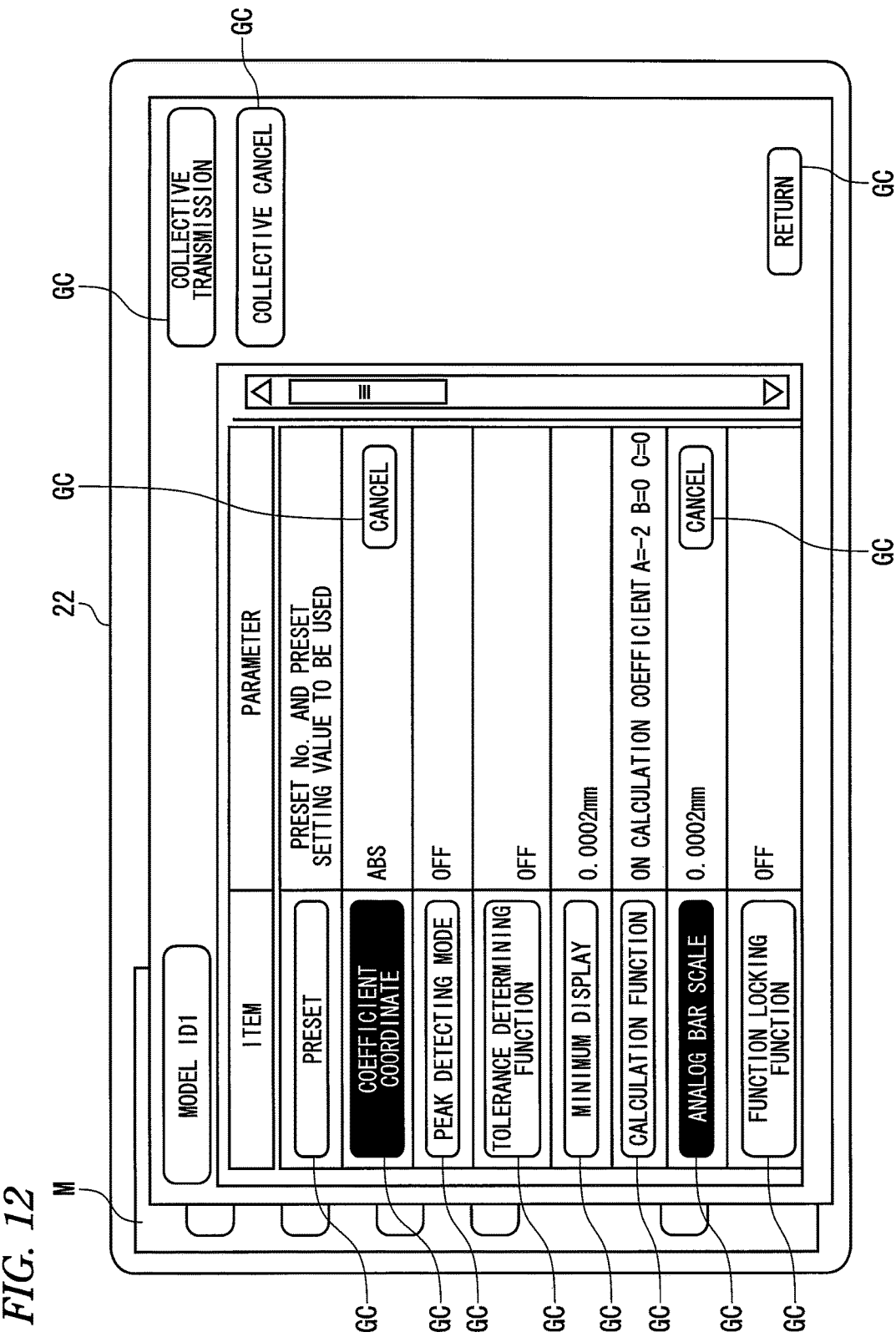
FIG. 12 is a diagram illustrating an example of specific screen transition and an example of parameter setting.

When the icon MC of "CHECK OF OVERALL ITEMS" in the menu M illustrated in FIG. 6C is selected, a window for displaying a list of setting items is displayed in a pop-up manner as illustrated in FIG. 12. In this window, setting items by models and details of the parameters corresponding to the setting items are displayed, for example, in the form of table.

In this list display, the setting items read from the measuring instrument 10 to the computer 20 and the parameters corresponding to the setting items are displayed. When a user changes and temporarily stores a parameter using the computer 20, the changed parameter which has been temporarily stored is displayed.

The setting item corresponding to the changed parameter may be displayed in a format different from the setting items which have not been changed. For example, a specific color is displayed for the changed setting item. Accordingly, it is possible to recognize changed setting items and non-changed setting items.

In the list display, the setting items may be displayed by the icons GC. When the user selects the icon GC of a desired setting item in the list display, a window for changing the parameter corresponding to the setting item can be displayed in a pop-up manner. A parameter is set in the pop-up display and the screen is returned to the list display by selecting the icon GC of "OK." In this list display, the changed parameter is reflected.

When the icon GC of "COLLECTIVE TRANSMISSION" is selected in the list display, the parameters corresponding to all the setting items displayed in the list can be collectively transmitted to the measuring instrument 10. For example, when the changed parameter is temporarily stored, the parameters which have been individually set and temporarily stored can be transmitted to the measuring instrument 10 at a time by checking the list display and selecting the icon GC of "COLLECTIVE TRANSMISSION." By transmitting the parameters from the computer to the measuring instrument 10, setting to the new parameter is performed in the measuring instrument 10. In the measuring instrument 10, confirmation may be carried out using configuration sound or the like when the parameters transmitted from the computer 20 are normally received.

In the list display, an icon GC of "CANCEL" may be installed, for example, in a parameter field of the changed setting item. When the icon GC of "CANCEL" is selected, a process of returning the changed parameter to the unchanged parameter can be performed for each setting item.

In the list display, an icon GC of "COLLECTIVE CANCEL" may be installed. When the icon GC of "COLLECTIVE CANCEL" is selected, a process of collectively returning the changed parameters to the unchanged parameters can be performed on all the setting items which have been changed and temporarily stored.

In this way, a user can simply set the parameters of the measuring instrument 10 without performing complicated button operations by operating the icons GC and MC on the monitor 22 with reference to the appearance image G displayed on the monitor 22 of the computer 20.

The parameter setting program of the measuring instrument 10 according to the above-mentioned embodiment may be recorded on a computer-readable recording medium MM. That is, a part or all of steps S101 to S109 illustrated in FIG. 2 may be recorded on a recording medium MM in a format which can be read by the computer 20. The parameter setting program of the measuring instrument 10 according to this embodiment may be transmitted via a network.

As described above, according to this embodiment, it is possible to provide a parameter setting method of a measuring instrument 10 and a parameter setting program of the measuring instrument 10 which can easily set parameters of the measuring instrument 10.

While the embodiment and specific examples thereof are described above, the invention is not limited to these examples. For example, the models, the setting items, and the screen display of the measuring instrument 10 are not limited to the above-mentioned details. Appropriate addition and deletion of elements and design change which are made to the above-mentioned embodiment or the specific examples by those skilled in the art are included in the scope of the invention, as long as they do not depart from the gist of the invention.

As described above, the invention can be suitably used for height gauges, digital calipers, digital micrometers, linear scales, and the like in addition to the indicator.

What is claimed is:

1. A parameter setting method of a measuring instrument connected with a computer, receiving an operation on a screen of the computer, and setting measurement-related parameters of the measuring instrument, the parameter setting method comprising:
reading model information, measurement-related setting items, and parameters corresponding to the setting items, which are stored in the measuring instrument, and temporarily storing the read data in a memory of the computer;
displaying an appearance image of the measuring instrument corresponding to the model information on the screen and displaying icons for selecting an operation on the screen at predetermined positions of the appearance image on the screen in correlation with each other;
displaying the setting item, which is able to be selected by an operation in the measuring instrument relevant to the predetermined position corresponding to the selected icon, on the screen when selection of the icon is received;
receiving changing of the parameter corresponding to the setting item using the computer; and
transmitting the changed parameter from the computer to the measuring instrument, wherein:

the displaying of the setting items on the screen includes displaying an item for selecting a type of an attachment attached to the measuring instrument; and the receiving of the changing of the parameter includes receiving a dimension corresponding to the type of the attachment and calculating a calculation coefficient used for measuring using the attachment from the dimension.

2. The parameter setting method according to claim 1, wherein:

the receiving of the changing of the parameter includes temporarily storing the changed parameter in the memory; and the transmitting of the changed parameter to the measuring instrument includes reading the changed parameter stored in the memory and transmitting the read parameter to the measuring instrument.

3. The parameter setting method according to claim 2, wherein the transmitting of the changed parameter to the measuring instrument includes reading the parameters corresponding to all the setting items stored in the memory and collectively transmitting the read parameters to the measuring instrument.

4. The parameter setting method according to claim 1, wherein the receiving of the changing of the parameter includes temporarily storing the changed parameter in the memory and returning the changed parameter stored in the memory to the original parameter when a cancel instruction is received.

5. The parameter setting method according to claim 1, further comprising displaying the icons corresponding to the setting items, in which the parameter is able to be changed by only the computer, on the screen.

6. The parameter setting method according to claim 1, further comprising displaying a list display icon, which is used to display a list of the setting items temporarily stored in the memory and the parameters corresponding to the setting items on the screen, on the screen.

7. The parameter setting method according to claim 1, wherein the receiving of the changing of the parameter includes displaying the setting item of the changed parameter on the screen in a format different from that of the setting items of which the parameters are not changed.

8. A computer-readable medium storing a parameter setting program for causing a computer to perform predetermined operations, the predetermined operation comprising:

reading model information, measurement-related setting items, and parameters corresponding to the setting items, which are stored in a measuring instrument connected with the computer, and temporarily storing the read data in a memory of the computer;

displaying an appearance image of the measuring instrument corresponding to the model information on the screen and displaying icons for selecting an operation on the screen at predetermined positions of the appearance image on the screen in correlation with each other;

displaying the setting item, which is able to be selected by an operation in the measuring instrument relevant to the predetermined position corresponding to the selected icon, on the screen when selection of the icon is received;

receiving changing of the parameter corresponding to the setting item; and transmitting the changed parameter to the measuring instrument, wherein:

the displaying of the setting items on the screen includes displaying an item for selecting a type of an attachment attached to the measuring instrument; and the receiving of the changing of the parameter includes receiving a dimension corresponding to the type of the attachment and calculating a calculation coefficient used for measuring using the attachment from the dimension.

9. The computer-readable medium according to claim 8, wherein:

the receiving of the changing of the parameter includes temporarily storing the changed parameter in the memory; and the transmitting of the changed parameter to the measuring instrument includes reading the changed parameter stored in the memory and transmitting the read parameter to the measuring instrument.

10. The computer-readable medium according to claim 9, wherein the transmitting of the changed parameter to the measuring instrument includes reading the parameters corresponding to all the setting items stored in the memory and collectively transmitting the read parameters to the measuring instrument.

11. The computer-readable medium according to claim 8, wherein the receiving of the changing of the parameter includes temporarily storing the changed parameter in the memory and returning the changed parameter stored in the memory to the original parameter when a cancel instruction is received.

12. The computer-readable medium according to claim 8, wherein the predetermined operation further includes displaying the icons corresponding to the setting items, in which the parameter is able to be changed by only the computer, on the screen.

13. The computer-readable medium according to claim 8, wherein the predetermined operation further includes displaying a list display icon, which is used to display a list of the setting items temporarily stored in the memory and the parameters corresponding to the setting items on the screen, on the screen.

14. The computer-readable medium according to claim 8, wherein the receiving of the changing of the parameter includes displaying the setting item of the changed parameter on the screen in a format different from that of the setting items of which the parameters are not changed.

15. A parameter setting method of a measuring instrument connected with a computer, receiving an operation on a screen of the computer, and setting measurement-related parameters of the measuring instrument, the parameter setting method comprising:

reading model information, measurement-related setting items, and parameters corresponding to the setting items, which are stored in the measuring instrument, and temporarily storing the read data in a memory of the computer;

displaying an appearance image of the measuring instrument corresponding to the model information on the screen and displaying icons for selecting an operation on the screen at predetermined positions of the appearance image on the screen in correlation with each other;

displaying the setting item, which is able to be selected by an operation in the measuring instrument relevant to the predetermined position corresponding to the selected icon, on the screen when selection of the icon is received;

displaying an inhibition selection item, in which only the computer is able to select whether to inhibit the changing of the parameter corresponding to the setting item, on the screen;

transmitting information, which indicates that the changing of the parameter of the setting item corresponding to the inhibition selection item is inhibited in the measuring instrument, from the computer to the measuring instrument when a setting of inhibiting the changing of the parameter of the inhibition selection item is received;

receiving changing of the parameter corresponding to the setting item using the computer; and transmitting the changed parameter from the computer to the measuring instrument.

16. The parameter setting method according to claim 15, wherein:

the receiving of the changing of the parameter includes temporarily storing the changed parameter in the memory; and the transmitting of the changed parameter to the measuring instrument includes reading the changed parameter stored in the memory and transmitting the read parameter to the measuring instrument.

17. The parameter setting method according to claim 16, wherein the transmitting of the changed parameter to the measuring instrument includes reading the parameters corresponding to all the setting items stored in the memory and collectively transmitting the read parameters to the measuring instrument.

18. The parameter setting method according to claim 15, wherein the receiving of the changing of the parameter includes temporarily storing the changed parameter in the memory and returning the changed parameter stored in the memory to the original parameter when a cancel instruction is received.

19. The parameter setting method according to claim 15, further comprising:

displaying the icons corresponding to the setting items, in which the parameter is able to be changed by only the computer, on the screen.

20. The parameter setting method according to claim 15, further comprising:

displaying a list display icon, which is used to display a list of the setting items temporarily stored in the memory and the parameters corresponding to the setting items on the screen, on the screen.

21. The parameter setting method according to claim 15, wherein the receiving of the changing of the parameter includes displaying the setting item of the changed parameter on the screen in a format different from that of the setting items of which the parameters are not changed.

22. A computer-readable medium storing a parameter setting program for causing a computer to perform predetermined operations, the predetermined operation comprising:

reading model information, measurement-related setting items, and parameters corresponding to the setting items, which are stored in a measuring instrument connected with the computer, and temporarily storing the read data in a memory of the computer;

displaying an appearance image of the measuring instrument corresponding to the model information on the screen and displaying icons for selecting an operation on the screen at predetermined positions of the appearance image on the screen in correlation with each other;

displaying the setting item, which is able to be selected by an operation in the measuring instrument relevant to the predetermined position corresponding to the selected icon, on the screen when selection of the icon is received;

displaying an inhibition selection item, in which only the computer is able to select whether to inhibit the changing of the parameter corresponding to the setting item, on the screen;

transmitting information, which indicates that the changing of the parameter of the setting item corresponding to the inhibition selection item is inhibited in the measuring instrument, from the computer to the measuring instrument when a setting of inhibiting the changing of the parameter of the inhibition selection item is received;

receiving changing of the parameter corresponding to the setting item; and transmitting the changed parameter to the measuring instrument.

23. The computer-readable medium according to claim 22, wherein:

the receiving of the changing of the parameter includes temporarily storing the changed parameter in the memory; and the transmitting of the changed parameter to the measuring instrument includes reading the changed parameter stored in the memory and transmitting the read parameter to the measuring instrument.

24. The computer-readable medium according to claim 23, wherein the transmitting of the changed parameter to the measuring instrument includes reading the parameters corresponding to all the setting items stored in the memory and collectively transmitting the read parameters to the measuring instrument.

25. The computer-readable medium according to claim 22, wherein the receiving of the changing of the parameter includes temporarily storing the changed parameter in the memory and returning the changed parameter stored in the memory to the original parameter when a cancel instruction is received.

26. The computer-readable medium according to claim 22, wherein the predetermined operation further includes displaying the icons corresponding to the setting items, in which the parameter is able to be changed by only the computer, on the screen.

27. The computer-readable medium according to claim 22, wherein the predetermined operation further includes displaying a list display icon, which is used to display a list of the setting items temporarily stored in the memory and the parameters corresponding to the setting items on the screen, on the screen.

28. The computer-readable medium according to claim 22, wherein the receiving of the changing of the parameter includes displaying the setting item of the changed parameter on the screen in a format different from that of the setting items of which the parameters are not changed.

* * * * *